US012068899B2

(12) United States Patent
Zhao et al.

(10) Patent No.: US 12,068,899 B2
(45) Date of Patent: *Aug. 20, 2024

(54) METHOD FOR SENDING RANDOM ACCESS PREAMBLE SEQUENCE, DEVICE, AND SYSTEM

(71) Applicant: Huawei Technologies Co., Ltd., Shenzhen (CN)

(72) Inventors: Yue Zhao, Beijing (CN); Zhiheng Guo, Beijing (CN); Qiang Wu, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 699 days.

This patent is subject to a terminal disclaimer.

(21) Appl. No.: 17/220,731

(22) Filed: Apr. 1, 2021

(65) Prior Publication Data

US 2021/0234627 A1 Jul. 29, 2021

Related U.S. Application Data

(63) Continuation of application No. 16/345,148, filed as application No. PCT/CN2016/103403 on Oct. 26, 2016, now Pat. No. 10,985,858.

(51) Int. Cl.
*H04L 27/26* (2006.01)
*H04J 13/00* (2011.01)

(52) U.S. Cl.
CPC ...... *H04L 27/2613* (2013.01); *H04J 13/0062* (2013.01); *H04L 27/26* (2013.01)

(58) Field of Classification Search
CPC . H04L 27/2613; H04L 27/26; H04L 27/2691; H04L 27/2657; H04L 27/2692;
(Continued)

(56) References Cited

U.S. PATENT DOCUMENTS

2012/0045011 A1 2/2012 Lee et al.
2014/0301345 A1 1/2014 Kim et al.
(Continued)

FOREIGN PATENT DOCUMENTS

CN 101605397 A 12/2009
CN 101820301 A 9/2010
(Continued)

OTHER PUBLICATIONS

"Evolved Universal Terrestrial Radio Access (E-UTRA); Physical channels and modulation," 3rd Generation Partnership Project, Technical Specification Group Radio Access Network, 3GPP TS 36.211, V14.0.0, Sep. 2016, 170 pages.
(Continued)

*Primary Examiner* — Charles C Jiang
*Assistant Examiner* — Rachel Elizabeth Marks
(74) *Attorney, Agent, or Firm* — Slater Matsil, LLP

(57) ABSTRACT

This application relates to the mobile communications field, and in particular, to a random access technology in a wireless communications system. This application provides a method for receiving a random access preamble sequence, an apparatus, and a system. In this solution, a device obtains a cyclic shift value that satisfies a high-speed movement scenario and receives a random access preamble sequence corresponding to the cyclic shift value.

22 Claims, 5 Drawing Sheets

(58) Field of Classification Search
CPC ............. H04J 13/0062; H04J 11/0026; H04W 74/0833
See application file for complete search history.

(56) References Cited

U.S. PATENT DOCUMENTS

| | | | |
|---|---|---|---|
| 2015/0163829 | A1 | 6/2015 | Li et al. |
| 2015/0236883 | A1 | 8/2015 | Yoon |
| 2015/0365977 | A1 | 12/2015 | Tabet et al. |
| 2016/0302187 | A1 | 10/2016 | Kim et al. |
| 2016/0353479 | A1* | 12/2016 | Wang .................. H04L 27/2613 |
| 2018/0220466 | A1* | 8/2018 | Park .................. H04W 74/0833 |
| 2019/0028243 | A1 | 1/2019 | Kim et al. |

FOREIGN PATENT DOCUMENTS

| | | |
|---|---|---|
| CN | 102387599 A | 3/2012 |
| CN | 104471885 A | 3/2015 |
| RU | 2572585 C1 | 1/2016 |

OTHER PUBLICATIONS

Huawei, "On the new restricted sets of cyclic shifts for PRACH for high speed," 3GPPTSG RAN WGl Meeting #88, R1-1703084, Feb. 13-17, 2017, 5 pages, Athens, Greece.

Huawei: "Restricted sets of cyclic shifts for PRACH in high speed scenario," 3GPP TSG RAN WG1 Meeting #86bis, Agenda Item: 7.2.11, R1-1609349, Oct. 10-14, 2016, 13 pages, Lisbon, Portugal.

Huawei: "On the support for legacy UEs in high speed cells," 3GPP TSG RAN WG1 Meeting #86bis, Agenda Item: 7.2.11, R1-1609350, Oct. 10-14, 2016, 4 pages, Lisbon, Portugal.

Huawei: "Introduction of PRACH enhancement for high speed scenario," 3GPP TSG RAN WG1 Meeting #86bis, R1-1609929, Oct. 10-14, 2016, 5 pages, version 14.0.0 Lisbon, Portugal.

Qualcomm Incorporated: "PRACH enhancements," 3GPP TSG RAN WG1 #86bis, Agenda Item: 7.2.11, R1-1610013, Oct. 10-14, 2016, 1 page, Lisbon, Portugal.

Nokia, Alcatel-Lucent Shanghai Bell: "PRACH for very high speed scenario," 3GPP TSG RAN WG1 Meeting #86bis, Agenda Item: 7.2.11, R1-1610223, Oct. 10-14, 2016, 2 pages, Lisbon, Portugal.

Session Chairman (Qualcomm Inc.): "Chairman's Notes of Agenda Item 7.2.11 Performance enhancements for high speed scenario," 3GPP TSG RAN WG1 Meeting #86bis, Agenda Item: 7.2.11, R1-1610874, Oct. 9-13, 2016, 1 page, Lisbon, Portugal.

Huawei, Hisilicon, Nokia, ASB, NTT, DOCOMO et al.: "WF on Performance enhancements for high speed scenario," 3GPP TSG RAN WG1 Meeting #86bis, Agenda Item: 7.2.11, R1-1610903, Oct. 10-14, 2016, 2 pages, Lisbon, Portugal.

Huawei, Hisilicon: "PRACH enhancement in high speed scenario," 3GPP TSG RAN WG1 Meeting #84bis, Agenda Item: 5, R1-162619, Apr. 11-15, 2016, 7 pages, Busan, Korea.

Qualcomm Incorporated: "PRACH enhancements," 3GPP TSG RAN WG1 #86, Agenda Item: 7.2.13, R1-166315, Aug. 22-26, 2016, 1 page, Gothenburg, Sweden.

Huawei: "Introduction of PRACH enhancement for high speed scenario," 3GPP TSG RAN WG1 Meeting #86, Version 13.2.0, R1-167416, Aug. 22-26, 2016, 5 pages, Gothenburg, Sweden.

Nokia, Alcatel-Lucent Shanghai Bell:"PRACH for very high speed UEs," 3GPP TSG RAN WG1 Meeting #86, Agenda Item: 7.2.13, R1-167773, Aug. 22-26, 2016, 2 pages, Gothenburg, Sweden.

Huawei: "PRACH enhancement in high speed scenario," 3GPP TSG RAN WG1 Meeting #86, Agenda Item: 7.2.13, R1-168354, Aug. 22-26, 2016, 10 pages, Gothenburg, Sweden.

Session Chairman (Qualcomm Inc.): "Chairman's Notes of Agenda Item 7.2.13 on Performance enhancements for high speed scenario," 3GPP TSG RAN WG1 Meeting #86, Agenda Item: 7.2.13, R1-168414, Aug. 22-26, 2016, 1 page, Gothenburg, Sweden.

Huawei, Hisilicon: "BS performance evaluation under new scenarios," 3GPP TSG-RAN WG4 Meeting #75, Agenda Item: 9.2.5, R4-152604, May 25-29, 2015, 4 pages, Fukuoka, Japan.

Ericsson: "Physical layer limits for Doppler frequency management," 3GPP TSG-RAN WG4 Meeting #75, Agenda Item: 9.2.5, R4-152961, May 25-29, 2015, 2 pages, Fukuoka, Japan.

Alcatel Lucent: "A New Cyclic Shift Restriction Set for Very High Speed Cells," 3GPP TSG-RAN WG4 Meeting #76, Agenda Item: 9.4.5, R4-154364, Aug. 24-28, 2015, 7 pages, Beijing, China.

\* cited by examiner

METHOD FOR SENDING RANDOM ACCESS PREAMBLE SEQUENCE, DEVICE, AND SYSTEM

CROSS-REFERENCE TO RELATED APPLICATIONS

This application is a continuation of U.S. patent application Ser. No. 16/345,148, filed on Apr. 25, 2019, which a national stage of International Application No. PCT/CN2016/103403, filed on Oct. 26, 2016. All of the aforementioned patent applications are hereby incorporated by reference in their entireties.

TECHNICAL FIELD

The present invention relates to the communications field, and in particular, to a method for sending a random access preamble sequence, a device, and a system.

BACKGROUND

If a terminal device communicates with a base station in high-speed movement, there is a frequency difference between a frequency at which the terminal device transmits a signal and a receive frequency of the base station. The difference is referred to as a Doppler frequency shift $f_D$, and $f_D=fv/c$, where f is a carrier frequency, v is a movement speed, and c is a speed of light. The Doppler frequency shift causes mutual interference between terminal devices during random access and also causes a vagueness problem that occurs during detection when the base station detects a random access preamble sequence sent by the terminal device.

In an existing Long Term Evolution (LTE) system, a Doppler frequency shift less than one time a PRACH subcarrier spacing is specially designed, thereby eliminating mutual interference between terminal devices during uplink random access and a vagueness problem during base station detection. When an LTE system performs communication at a higher working frequency or when a terminal device has a very high movement speed, a Doppler frequency shift may be greater than one time the PRACH subcarrier spacing and less than twice the PRACH subcarrier spacing. An optimization design is made to some degree in the LTE Release 14, thereby alleviating mutual interference between terminal devices during random access and reducing a vagueness problem during base station detection.

However, for a situation in which when the LTE system performs communication at a higher working frequency or the terminal device has a very high movement speed, a Doppler frequency shift may be greater than one time the PRACH subcarrier spacing and less than twice the PRACH subcarrier spacing, mutual interference between terminal devices and a vagueness problem during base station detection still exist at present.

SUMMARY

A method for sending a random access preamble sequence, a device, and a system support a random access process at a high speed, and avoid mutual interference between terminal devices during random access in a high-speed scenario.

According to a first aspect, an embodiment of this application provides a method for sending a random access preamble sequence. The method includes:

sending, by a terminal device, a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \le n \le N_{ZC}-1, N_{ZC}$$

is a sequence length of $x_u(n)$, mod represents a modulo operation, and $C_v$ satisfies:

$$C_v = \begin{cases} d_{start}\lfloor v/n_{shift}^{RA} \rfloor + (v \bmod n_{shift}^{RA})N_{CS} & v = 0, 1, \ldots, n_{group}^{RA} n_{shift}^{RA} + \bar{n}_{shift}^{RA} - 1 \\ \bar{d}_{start} + (v - n_{shift}^{RA} n_{group}^{RA} - \bar{n}_{shift}^{RA})N_{CS} & v = n_{shift}^{RA} n_{group}^{RA} + \bar{n}_{shift}^{RA}, \ldots, n_{shift}^{RA} n_{group}^{RA} + \bar{n}_{shift}^{RA} + \bar{\bar{n}}_{shift}^{RA} - 1 \\ \bar{\bar{d}}_{start} + (v - n_{shift}^{RA} n_{group}^{RA} - \bar{n}_{shift}^{RA} - \bar{\bar{n}}_{shift}^{RA})N_{CS} & v = n_{shift}^{RA} n_{group}^{RA} + \bar{n}_{shift}^{RA} + \bar{\bar{n}}_{shift}^{RA}, \ldots, n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1, \end{cases}$$

where $N_{CS}$ is an integer; and for $$\frac{N_{ZC} + N_{CS}}{4} \le d_u < \frac{2}{7}N_{ZC}, n_{shift}^{RA}, d_{start}, n_{group}^{RA} \bar{n}_{shift}^{RA}, \bar{\bar{n}}_{shift}^{RA}, \bar{\bar{\bar{n}}}_{shift}^{RA},$$

$\bar{d}_{start}$, and $\bar{\bar{d}}_{start}$ satisfy:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\bar{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\bar{\bar{n}}_{shift}^{RA} = \lfloor \min(d_u - n_{group}^{RA} \cdot d_{start}, 4d_u - N_{ZC} - \bar{n}_{shift}^{RA} N_{ZC})/N_{CS} \rfloor$$

$$\bar{d}_{start} = N_{ZC} - 3d_u + n_{group}^{RA} \cdot d_{start} + \bar{n}_{shift}^{RA} N_{CS}$$

$$\bar{\bar{\bar{n}}}_{shift}^{RA} = \lfloor ((1 - \min(1, \bar{\bar{n}}_{shift}^{RA}))(d_u - n_{group}^{RA} \cdot d_{start}) + \min(1, \bar{\bar{n}}_{shift}^{RA})(4d_u - N_{ZC} - \bar{n}_{shift}^{RA} N_{CS}))/N_{CS} \rfloor - \bar{n}_{shift}^{RA}$$

$$\bar{\bar{d}}_{start} = N_{ZC} - 2d_u + n_{group}^{RA} \cdot d_{start} + \bar{n}_{shift}^{RA} N_{CS};$$

for $$\frac{2}{7}N_{ZC} \le d_u \le \frac{N_{ZC} - N_{CS}}{3}, n_{shift}^{RA}, d_{start}, n_{group}^{RA}, \overline{n}_{shift}^{RA}, \overline{\overline{n}}_{shift}^{RA}, \overline{\overline{\overline{n}}}_{shift}^{RA},$$

$$\overline{d}_{start}, \text{ and } \overline{\overline{d}}_{start}$$

satisfy:

$$n_{shift}^{RA} = \left\lfloor \frac{N_{ZC} - 3d_u}{N_{CS}} \right\rfloor$$

$$d_{start} = N_{ZC} - 3d_u + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\overline{\overline{n}}_{shift}^{RA} = \left\lfloor \min(d_u - n_{group}^{RA} \cdot d_{start}, N_{ZC} - 3d_u - \overline{n}_{shift}^{RA} N_{CS})/N_{CS} \right\rfloor$$

$$\overline{d}_{start} = d_u + n_{group}^{RA} \cdot d_{start} + \overline{n}_{shift}^{RA} N_{CS}$$

$$\overline{\overline{\overline{n}}}_{shift}^{RA} = 0, \overline{\overline{d}}_{start} = 0;$$

for $$\frac{N_{ZC} + N_{CS}}{3} \le d_u < \frac{2N_{ZC}}{5}, n_{shift}^{RA}, d_{start}, n_{group}^{RA}, \overline{n}_{shift}^{RA}, \overline{\overline{n}}_{shift}^{RA}, \overline{\overline{\overline{n}}}_{shift}^{RA},$$

$$\overline{d}_{start}, \text{ and } \overline{\overline{d}}_{start}$$

satisfy:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor \text{ or}$$

$$\overline{n}_{shift}^{RA} = \max\left(\left\lfloor \frac{N_{ZC} - 2d_u - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0;$$

for $$\frac{2N_{ZC}}{5} \le d_u \le \frac{N_{ZC} - N_{CS}}{2}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy $$n_{shift}^{RA} = \left\lfloor \frac{N_{ZC} - 2d_u}{N_{CS}} \right\rfloor$$

$$d_{start} = 2(N_{ZC} - 2d_u) + n_{shift}^{RA} \cdot N_{CS}$$

$$n_{group}^{RA} = \left\lfloor \frac{N_{ZC} - d_u}{d_{start}} \right\rfloor$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0,$$

where $d_u$ satisfies:

$$d_u = \begin{cases} p & 0 \le p < N_{ZC}/2 \\ N_{ZC} - p & \text{otherwise (otherwise)} \end{cases},$$

and p is defined as a smallest nonnegative integer that satisfies $(p \times u) \bmod N_{ZC} = 1$.

When the terminal device sends the random access preamble sequence according to the foregoing method, a success rate of random access can be improved.

According to a second aspect, an embodiment of this application provides a method for receiving a random access preamble sequence. The method includes:

receiving, by a base station, a random access preamble sequence signal based on a random access preamble sequence $x_{u,v}(n)$, where $x_{u,v}(n)$ satisfies $x_{u,v}(n) = x_u((n + C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \le n \le N_{ZC} - 1, N_{ZC}$$

is a sequence length of $x_u(n)$, mod represents a modulo operation, and $C_v$ satisfies:

$$C_v = \begin{cases} d_{start}\lfloor v/n_{shift}^{RA} \rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{d}_{start} + (v - n_{shift}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{d}}_{start} + (v - n_{shift}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1, \end{cases}$$

where $N_{CS}$ is an integer; and
for $$\frac{N_{ZC}+N_{CS}}{4} \le d_u < \frac{2}{7}N_{ZC}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{\overline{d}}_{start}, \text{ and } \overline{\overline{\overline{d}}}_{start}$$

satisfy:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\overline{\overline{n}}_{shift}^{RA} = \left\lfloor \min(d_u - n_{group}^{RA} \cdot d_{start}, 4d_u - N_{ZC} - \overline{n}_{shift}^{RA} N_{CS}) / N_{CS} \right\rfloor$$

$$\overline{\overline{d}}_{start} = N_{ZC} - 3d_u + n_{group}^{RA} \cdot d_{start} + \overline{n}_{shift}^{RA} N_{CS}$$

$$\overline{\overline{\overline{n}}}_{shift}^{RA} = \lfloor ((1 - \min(1, \overline{n}_{shift}^{RA}))(d_u - n_{group}^{RA} \cdot d_{start}) + \min(1, \overline{n}_{shift}^{RA})(4d_u - N_{ZC} - \overline{n}_{shift}^{RA} N_{CS})) / N_{CS} \rfloor - \overline{n}_{shift}^{RA}$$

$$\overline{\overline{\overline{d}}}_{start} = N_{ZC} - 2d_u + n_{group}^{RA} \cdot d_{start} + \overline{\overline{n}}_{shift}^{RA} N_{CS};$$

for $$\frac{2}{7}N_{ZC} \le d_u \le \frac{N_{ZC} - N_{CS}}{3}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{\overline{d}}_{start}, \text{ and } \overline{\overline{\overline{d}}}_{start}$$

satisfy:

$$n_{shift}^{RA} = \left\lfloor \frac{N_{ZC} - 3d_u}{N_{CS}} \right\rfloor$$

$$d_{start} = N_{ZC} - 3d_u + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, N_{ZC} - 3d_u - \overline{n}_{shift}^{RA} N_{CS}) / N_{CS} \rfloor$$

$$\overline{\overline{d}}_{start} = d_u + n_{group}^{RA} \cdot d_{start} + \overline{n}_{shift}^{RA} N_{CS}$$

$$\overline{\overline{\overline{n}}}_{shift}^{RA} = 0, \overline{\overline{\overline{d}}}_{start} = 0;$$

for $$\frac{N_{ZC} + N_{CS}}{3} \le d_u < \frac{2N_{ZC}}{5}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{\overline{d}}_{start}, \text{ and } \overline{\overline{\overline{d}}}_{start}$$

satisfy:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor \text{ or}$$

$$\overline{n}_{shift}^{RA} = \max\left(\left\lfloor \frac{N_{ZC} - 2d_u - n_{group}^{RA} \cdot d_{start}}{N_{CS}} \right\rfloor, 0\right)$$

$$\overline{\overline{n}}_{shift}^{RA} = 0, \overline{\overline{d}}_{start} = 0, \overline{\overline{\overline{n}}}_{shift}^{RA} = 0, \overline{\overline{\overline{d}}}_{start} = 0;$$

for $$\frac{2N_{ZC}}{5} \le d_u \le \frac{N_{ZC} - N_{CS}}{2}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{\overline{d}}_{start}, \text{ and } \overline{\overline{\overline{d}}}_{start}$$

satisfy:

$$n_{shift}^{RA} = \left\lfloor \frac{N_{ZC} - 2d_u}{N_{CS}} \right\rfloor$$

$$d_{start} = 2(N_{ZC} - 2d_u) + n_{shift}^{RA} \cdot N_{CS}$$

$$n_{group}^{RA} = \left\lfloor \frac{N_{ZC} - d_u}{s_{start}} \right\rfloor$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\overline{\overline{n}}_{shift}^{RA} = 0, \overline{\overline{d}}_{start} = 0, \overline{\overline{\overline{n}}}_{shift}^{RA} = 0, \overline{\overline{\overline{d}}}_{start} = 0,$$

where $d_u$ satisfies:

$$d_u = \begin{cases} p & 0 \le p < N_{ZC}/2 \\ N_{ZC} - p & \text{otherwise (otherwise)} \end{cases}$$

and p is defined as a smallest nonnegative integer that satisfies $(p \times u) \bmod N_{ZC} = 1$.

The base station receives the random access preamble sequence according to the foregoing method. Therefore, when different terminal devices simultaneously send random access preamble sequences and the random access preamble sequences of the different terminal devices correspond to different $C_v$, mutual interference between the terminal devices can be avoided, thereby improving a success rate of random access.

According to a third aspect, an embodiment of this application provides a terminal device. The terminal device has a function of implementing behavior of the terminal device in the foregoing method. The function may be implemented by hardware or may be implemented by hardware by executing corresponding software. The hardware or software includes one or more modules corresponding to the foregoing function. The modules may be software and/or hardware.

The Terminal Device Includes:
   a processing unit, configured to determine a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, \ 0 \le n \le N_{ZC} - 1, \ N_{ZC}$$

is a sequence length of $x_u(n)$, mod represents a modulo operation, and $C_v$ satisfies:

$$C_v = \begin{cases} d_{start}\lfloor v/n_{shift}^{RA}\rfloor + v \bmod n_{shift}^{RA})N_{CS} & v = 0, 1, \ldots, n_{group}^{RA} n_{shift}^{RA} + \overline{n}_{shift}^{RA} - 1 \\ \overline{\overline{d}}_{start} + (v - n_{shift}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{\overline{d}}}_{start} + (v - n_{shift}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1, \end{cases}$$

where $N_{CS}$ is an integer; and
for $$\frac{N_{ZC} + N_{CS}}{4} \le d_u < \frac{2}{7}N_{ZC}, \ n_{shift}^{RA}, \ d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{\overline{d}}_{start}, \text{ and } \overline{\overline{\overline{d}}}_{start}$$

satisfy:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, 4d_u - N_{ZC} - \overline{n}_{shift}^{RA} N_{CS})/N_{CS} \rfloor$$

$$\overline{\overline{d}}_{start} = N_{ZC} - 3d_u + n_{group}^{RA} \cdot d_{start} + \overline{n}_{shift}^{RA} N_{CS}$$

$$\overline{\overline{\overline{n}}}_{shift}^{RA} = \lfloor ((1 - \min(1, \overline{n}_{shift}^{RA}))(d_u - n_{group}^{RA} \cdot d_{start}) + \min(1, \overline{n}_{shift}^{RA})(4d_u - N_{ZC} - \overline{n}_{shift}^{RA} N_{CS}))/N_{CS} \rfloor - \overline{\overline{n}}_{shift}^{RA}$$

$$\overline{\overline{\overline{d}}}_{start} = N_{ZC} - 2d_u + n_{group}^{RA} \cdot d_{start} + \overline{\overline{n}}_{shift}^{RA} N_{CS};$$

for $$\frac{2}{7}N_{ZC} \le d_u \le \frac{N_{ZC} - N_{CS}}{3}, \ n_{shift}^{RA}, \ d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{\overline{d}}_{start}, \text{ and } \overline{\overline{\overline{d}}}_{start}$$

satisfy:

$$n_{shift}^{RA} = \left\lfloor \frac{N_{ZC} - 3d_u}{N_{CS}} \right\rfloor$$

$$d_{start} = N_{ZC} - 3d_u + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, N_{ZC} - 3d_u - \overline{n}_{shift}^{RA} N_{CS})/N_{CS} \rfloor$$

$$\overline{\overline{d}}_{start} = d_u + n_{group}^{RA} \cdot d_{start} + \overline{n}_{shift}^{RA} N_{CS}$$

$$\overline{\overline{\overline{n}}}_{shift}^{RA} = 0, \ \overline{\overline{\overline{d}}}_{start} = 0;$$

for $$\frac{N_{ZC} + N_{CS}}{3} \le d_u < \frac{2N_{ZC}}{5}, \ n_{shift}^{RA}, \ d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{\overline{d}}_{start}, \text{ and } \overline{\overline{\overline{d}}}_{start}$$

satisfy:

$$n_{shift}^{RA} = \left\lfloor \frac{2d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor \text{ or }$$

$$\overline{n}_{shift}^{RA} = \max\left(\left\lfloor \frac{N_{ZC} - 2d_u - n_{group}^{RA} \cdot d_{start}}{N_{CS}} \right\rfloor, 0\right)$$

$$\overline{\overline{n}}_{shift}^{RA} = 0, \ \overline{\overline{d}}_{start} = 0, \ \overline{\overline{\overline{n}}}_{shift}^{RA} = 0, \ \overline{\overline{\overline{d}}}_{start} = 0;$$

for $$\frac{2N_{ZC}}{5} \le d_u \le \frac{N_{ZC} - N_{CS}}{2}, \ n_{shift}^{RA}, \ d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{\overline{d}}_{start}, \text{ and } \overline{\overline{\overline{d}}}_{start}$$

satisfy:

$$n_{shift}^{RA} = \left\lfloor \frac{N_{ZC} - 2d_u}{N_{CS}} \right\rfloor$$

$$d_{start} = 2(N_{ZC} - 2d_u) + n_{shift}^{RA} \cdot N_{CS}$$

$$n_{group}^{RA} = \left\lfloor \frac{N_{ZC} - d_u}{d_{start}} \right\rfloor$$

$$\overline{n}_{shift}^{RA} = \max\left(\left\lfloor \frac{3d_u - N_{ZC} - n_{shift}^{RA} \cdot d_{start}}{N_{CS}} \right\rfloor, 0\right)$$

$$\overline{\overline{n}}_{shift}^{RA} = 0, \overline{\overline{d}}_{start} = 0, \overline{\overline{n}}_{shift}^{RA} = 0, \overline{\overline{d}}_{start} = 0,$$

where $d_u$ satisfies:

$$d_u = \begin{cases} p & 0 \le p < N_{ZC}/2 \\ N_{ZC} - p & \text{otherwise (otherwise)} \end{cases},$$

p is defined as a smallest nonnegative integer that satisfies (p×u)mod $N_{ZC}$=1; and a sending unit, configured to send $x_{u,v}(n)$.

According to a fourth aspect, an embodiment of this application provides a base station. The base station has a function of implementing behavior of the base station in the foregoing method. The function may be implemented by hardware or may be implemented by hardware by executing corresponding software. The hardware or software includes one or more modules corresponding to the foregoing function.

The Base Station Includes:
 a receiving unit, configured to receive a random access preamble sequence signal; and
 a processing unit, configured to process the random access preamble sequence signal based on a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \le n \le N_{ZC} - 1, N_{ZC}$$

is a sequence length of $x_u(n)$, mod represents a modulo operation, and $C_v$ satisfies:

$$C_v = \begin{cases} d_{start}\lfloor v/n_{shift}^{RA}\rfloor + v \bmod n_{shift}^{RA})N_{CS} & v = 0, 1, \ldots, n_{group}^{RA}n_{shift}^{RA} + \overline{n}_{shift}^{RA} - 1 \\ \overline{d}_{start} + (v - n_{shift}^{RA}n_{group}^{RA} - \overline{n}_{shift}^{RA})N_{CS} & v = n_{shift}^{RA}n_{group}^{RA} + \overline{n}_{shift}^{RA}, \ldots, n_{shift}^{RA}n_{group}^{RA} + \overline{n}_{shift}^{RA} + \overline{\overline{n}}_{shift}^{RA} - 1 \\ \overline{\overline{d}}_{start} + (v - n_{shift}^{RA}n_{group}^{RA} - \overline{n}_{shift}^{RA} - \overline{\overline{n}}_{shift}^{RA})N_{CS} & v = n_{shift}^{RA}n_{group}^{RA} + \overline{n}_{shift}^{RA} + \overline{\overline{n}}_{shift}^{RA}, \ldots, n_{shift}^{RA}n_{group}^{RA} + \overline{n}_{shift}^{RA} + \overline{\overline{n}}_{shift}^{RA} + \overline{\overline{\overline{n}}}_{shift}^{RA} - 1, \end{cases}$$

where $N_{CS}$ is an integer; and
for $$\frac{N_{ZC} + N_{CS}}{4} \le d_u < \frac{2}{7}N_{ZC}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, 4d_u - N_{ZC} - \overline{n}_{shift}^{RA} N_{CS})/N_{CS} \rfloor$$

$$\overline{d}_{start} = N_{ZC} - 3d_u + n_{group}^{RA} \cdot d_{start} + \overline{n}_{shift}^{RA} N_{CS}$$

$$\overline{\overline{\overline{n}}}_{shift}^{RA} = \lfloor ((1 - \min(1, \overline{n}_{shift}^{RA}))(d_u - n_{group}^{RA} \cdot d_{start}) + \min(1, \overline{n}_{shift}^{RA})(4d_u - N_{ZC} - \overline{n}_{shift}^{RA} N_{CS}))/N_{CS} \rfloor - \overline{\overline{n}}_{shift}^{RA}$$

$$\overline{\overline{d}}_{start} = N_{ZC} - 2d_u + n_{group}^{RA} \cdot d_{start} + \overline{\overline{n}}_{shift}^{RA} N_{CS};$$

for $$\frac{2}{7}N_{ZC} \le d_u \le \frac{N_{ZC} - N_{CS}}{3}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{N_{ZC} - 3d_u}{N_{CS}} \right\rfloor$$

$$d_{start} = N_{ZC} - 3d_u + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, N_{ZC} - \overline{n}_{shift}^{RA} N_{CS})/N_{CS} \rfloor$$

$$\overline{\overline{d}}_{start} = d_u + n_{group}^{RA} \cdot d_{start} + \overline{n}_{shift}^{RA} N_{CS}$$

$$\overline{\overline{\overline{n}}}_{shift}^{RA} = 0, \overline{\overline{\overline{d}}}_{start} = 0;$$

for $$\frac{N_{ZC} + N_{CS}}{3} \le d_u < \frac{2N_{ZC}}{5}, n_{shift}^{RA}, d_{start}, n_{group}^{RA}, \overline{n}_{shift}^{RA}, \overline{\overline{n}}_{shift}^{RA}, \overline{\overline{\overline{n}}}_{shift}^{RA},$$

$$d_{start}, \text{ and } \overline{\overline{d}}_{start}$$

satisfy:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor \text{ or}$$

$$\overline{n}_{shift}^{RA} = \max\left(\left\lfloor \frac{N_{ZC} - 2d_u - n_{group}^{RA} \cdot d_{start}}{N_{CS}} \right\rfloor, 0\right)$$

$$\overline{\overline{n}}_{shift}^{RA} = 0, \overline{\overline{d}}_{start} = 0, \overline{\overline{\overline{n}}}_{shift}^{RA} = 0, \overline{\overline{\overline{d}}}_{start} = 0;$$

for $$\frac{2N_{ZC}}{5} \le d_u \le \frac{N_{ZC} - N_{CS}}{2}, n_{shift}^{RA}, d_{start}, n_{group}^{RA} \overline{n}_{shift}^{RA}, \overline{n}_{shift}^{RA}, \overline{\overline{n}}_{shift}^{RA}, d_{start}, \text{ and } \overline{\overline{\overline{d}}}_{start}$$

satisfy:

$$n_{shift}^{RA} = \left\lfloor \frac{N_{ZC} - 2d_u}{N_{CS}} \right\rfloor$$

$$d_{start} = 2(N_{ZC} - 2d_u) + n_{shift}^{RA} \cdot N_{CS}$$

$$n_{group}^{RA} = \left\lfloor \frac{N_{ZC} - d_u}{d_{start}} \right\rfloor$$

-continued $$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\overline{\overline{n}}_{shift}^{RA} = 0, \overline{\overline{d}}_{start} = 0, \overline{\overline{\overline{n}}}_{shift}^{RA} = 0, \overline{\overline{\overline{d}}}_{start} = 0,$$

where $d_u$ satisfies:

$$d_u = \begin{cases} p & 0 \le p < N_{ZC}/2 \\ N_{ZC} - p & \text{otherwise (otherwise)} \end{cases}$$

and p is defined as a smallest nonnegative integer that satisfies (p×u) mod $N_{ZC}$=1.

According to a fifth aspect, an embodiment of this application provides a method for sending a random access preamble sequence. The method includes:

sending, by a terminal device, a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \le n \le N_{ZC} - 1, N_{ZC}$$

is a sequence length of $x_u(n)$, mod represents a modulo operation, and $C_v$ satisfies:

$$C_v = \begin{cases} d_{start}\lfloor v/n_{shift}^{RA}\rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{\overline{d}}_{start} + (v - n_{shift}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{\overline{d}}}_{start} + (v - n_{shift}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1, \end{cases}$$

where $N_{CS}$ is an integer; and
if $$\frac{N_{ZC}+N_{CS}}{4} \le d_u < \frac{2}{7}N_{ZC},\ n_{shift}^{RA},\ d_{start},\ n_{group}^{RA}\overline{n}_{shift}^{RA},\ \overline{n}_{shift}^{RA},\ \overline{\overline{n}}_{shift}^{RA},$$

$$\overline{d}_{start},\ \text{and}\ \overline{\overline{d}}_{start}$$

satisfy:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}\ 4d_u - N_{ZC} - \overline{n}_{shift}^{RA}N_{CS})/N_{CS} \rfloor$$

$$\overline{d}_{start} = N_{ZC} - 3d_u + n_{group}^{RA} \cdot d_{start} + \overline{n}_{shift}^{RA}N_{CS}$$

$$\overline{\overline{n}}_{shift}^{RA} = \lfloor ((1 - \min(1, \overline{n}_{shift}^{RA}))(d_u - n_{group}^{RA} \cdot d_{start}) +$$

$$\min(1, \overline{n}_{shift}^{RA})(4d_u - N_{ZC} - \overline{n}_{shift}^{RA}N_{CS}))/N_{CS} \rfloor - \overline{n}_{shift}^{RA}$$

$$\overline{\overline{d}}_{start} = N_{ZC} - 2d_u + n_{group}^{RA} \cdot d_{start} + \overline{n}_{shift}^{RA}N_{CS},$$

where $d_u$ satisfies:

$$d_u = \begin{cases} p & 0 \le p < N_{ZC}/2 \\ N_{ZC} - p & \text{otherwise (otherwise)} \end{cases}$$

and
p is defined as a smallest nonnegative integer that satisfies (p×u)mod $N_{ZC}$=1.

When the terminal device sends the random access preamble sequence according to the foregoing method, a success rate of random access can be improved.

According to a sixth aspect, an embodiment of this application provides a method for receiving a random access preamble sequence. The method includes:

receiving, by a base station, a random access preamble sequence signal based on a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}},\ 0 \le n \le N_{ZC}-1,\ N_{ZC}$$

is a sequence length of $x_u(n)$, mod represents a modulo operation, and
$C_v$ satisfies:

where $N_{CS}$ is an integer; and
for $$\frac{N_{ZC}+N_{CS}}{4} \le d_u < \frac{2}{7}N_{ZC},\ n_{shift}^{RA},\ d_{start},\ n_{group}^{RA},\ \overline{n}_{shift}^{RA},\ \overline{\overline{n}}_{shift}^{RA},$$

$$\overline{d}_{start},\ \text{and}\ \overline{\overline{d}}_{start}$$

satisfy:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start},\ 4d_u - N_{ZC} - \overline{n}_{shift}^{RA}N_{CS})/N_{CS} \rfloor$$

$$\overline{d}_{start} = N_{ZC} - 3d_u + n_{group}^{RA} \cdot d_{start} + \overline{n}_{shift}^{RA}N_{CS}$$

$$\overline{\overline{n}}_{shift}^{RA} = \lfloor ((1 - \min(1, \overline{n}_{shift}^{RA}))(d_u - n_{group}^{RA} \cdot d_{start}) +$$

$$\min(1, \overline{n}_{shift}^{RA})(4d_u - N_{ZC} - \overline{n}_{shift}^{RA}N_{CS}))/N_{CS} \rfloor - \overline{n}_{shift}^{RA}$$

$$\overline{\overline{d}}_{start} = N_{ZC} - 2d_u + n_{group}^{RA} \cdot d_{start} + \overline{n}_{shift}^{RA}N_{CS},$$

where $d_u$ satisfies:

$$d_u = \begin{cases} p & 0 \le p < N_{ZC}/2 \\ N_{ZC} - p & \text{otherwise(otherwise)} \end{cases},$$

p is defined as a smallest nonnegative integer that satisfies (p×u)mod $N_{ZC}$=1.

The base station receives the random access preamble sequence according to the foregoing method. Therefore, when different terminal devices simultaneously send random access preamble sequences and the random access preamble sequences of the different terminal devices correspond to different $C_v$, mutual interference between the terminal devices can be avoided, thereby improving a success rate of random access.

According to a seventh aspect, an embodiment of this application provides a terminal device. The terminal device has a function of implementing behavior of the terminal device in the foregoing method. The function may be implemented by hardware or may be implemented by hardware by executing corresponding software. The hardware or software includes one or more modules corresponding to the foregoing function. The modules may be software and/or hardware.

The Terminal Device Includes:
a processing unit, configured to determine a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is defined as:

$$C_v = \begin{cases} d_{start}\lfloor v/n_{shift}^{RA} \rfloor + (v \bmod n_{shift}^{RA})N_{CS} & v = 0, 1, \ldots, n_{group}^{RA}n_{shift}^{RA} + \overline{n}_{shift}^{RA} - 1 \\ \overline{d}_{start} + (v - n_{shift}^{RA}n_{group}^{RA} - \overline{n}_{shift}^{RA})N_{CS} & v = n_{shift}^{RA}n_{group}^{RA} + \overline{n}_{shift}^{RA}, \ldots, n_{shift}^{RA}n_{group}^{RA} + \overline{n}_{shift}^{RA} + \overline{\overline{n}}_{shift}^{RA} - 1 \\ \overline{\overline{d}}_{start} + (v - n_{shift}^{RA}n_{group}^{RA} - \overline{n}_{shift}^{RA} - \overline{\overline{n}}_{shift}^{RA})N_{CS} & v = n_{shift}^{RA}n_{group}^{RA} + \overline{n}_{shift}^{RA} + \overline{\overline{n}}_{shift}^{RA}, \ldots, n_{shift}^{RA}n_{group}^{RA} + \overline{n}_{shift}^{RA} + \overline{\overline{n}}_{shift}^{RA} + \overline{\overline{\overline{n}}}_{shift}^{RA} - 1, \end{cases}$$

$$x_u(n) = e^{-j\frac{\pi un(n+1)}{N_{ZC}}}, 0 \le n \le N_{ZC} - 1, N_{ZC}$$

is a sequence length of $x_u(n)$, mod represents a modulo operation, and
$C_v$ satisfies:

$$C_v = \begin{cases} d_{start}\lfloor v/n_{shift}^{RA}\rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{d}_{start} + (v - n_{shift}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{d}}_{start} + (v - n_{shift}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1, \end{cases}$$

where $N_{CS}$ is an integer; and
for $$\frac{N_{ZC} + N_{CS}}{4} \le d_u < \frac{2}{7}N_{ZC}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, 4d_u - N_{ZC} - \overline{n}_{shift}^{RA} N_{CS})/N_{CS} \rfloor$$

$$\overline{d}_{start} = N_{ZC} - 3d_u + n_{group}^{RA} \cdot d_{start} + \overline{n}_{start}^{RA} N_{CS}$$

$$\overline{\overline{\overline{n}}}_{shift}^{RA} = \lfloor ((1 - \min(1, \overline{n}_{shift}^{RA}))(d_u - n_{group}^{RA} \cdot d_{start}) +$$

$$\min(1, \overline{n}_{start}^{RA})(4d_u - N_{ZC} - \overline{n}_{shift}^{RA} N_{CS}))/N_{CS} \rfloor - \overline{\overline{n}}_{shift}^{RA}$$

$$\overline{\overline{d}}_{start} = N_{ZC} - 2d_u + n_{group}^{RA} \cdot d_{start} + \overline{\overline{n}}_{shift}^{RA} N_{CS},$$

where $d_u$ satisfies:

$$d_u = \begin{cases} p & 0 \le p < N_{ZC}/2 \\ N_{ZC} - p & \text{otherwise(otherwise)} \end{cases},$$

and
p is defined as a smallest nonnegative integer that satisfies $(p \times u) \bmod N_{ZC} = 1$; and
a sending unit, configured to send $x_{u,v}(n)$.

According to an eighth aspect, an embodiment of this application provides a base station. The base station has a function of implementing behavior of the base station in the foregoing method. The function may be implemented by hardware or may be implemented by hardware by executing corresponding software. The hardware or software includes one or more modules corresponding to the foregoing function.

The Base Station Includes:
a receiving unit, configured to receive a random access preamble sequence signal; and
a processing unit, configured to process the random access preamble sequence signal based on a random access preamble sequence $x_{u,v}(n)$, where $x_{u,v}(n)$ satisfies $x_{u,v}(n) = x_u((n+C_v) \bmod N_{ZC})$, a ZC (Zadoff-Chu) sequence whose root sequence number is u is defined as:

$$x_u(n) = e^{-j\frac{\pi un(n+1)}{N_{ZC}}}, 0 \le n \le N_{ZC} - 1, N_{ZC}$$

is a sequence length of $x_u(n)$, mod represents a modulo operation, and
$C_v$ satisfies:

$$C_v = \begin{cases} d_{start}\lfloor v/n_{shift}^{RA}\rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{d}_{start} + (v - n_{shift}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{d}}_{start} + (v - n_{shift}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1, \end{cases}$$

where $N_{CS}$ is an integer; and
for $$\frac{N_{ZC} + N_{CS}}{4} \le d_u < \frac{2}{7} N_{ZC}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{\overline{d}}_{start}, \text{ and } \overline{\overline{\overline{d}}}_{start}$$

satisfy:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, 4d_u - N_{ZC} - \overline{n}_{shift}^{RA} N_{CS})/N_{CS} \rfloor$$

$$\overline{\overline{d}}_{start} = N_{ZC} - 3d_u + n_{group}^{RA} \cdot d_{start} + \overline{n}_{start}^{RA} N_{CS}$$

$$\overline{\overline{\overline{n}}}_{shift}^{RA} = \lfloor ((1 - \min(1, \overline{n}_{shift}^{RA}))(d_u - n_{group}^{RA} \cdot d_{start}) +$$
$$\min(1, \overline{n}_{start}^{RA})(4d_u - N_{ZC} - \overline{n}_{shift}^{RA} N_{CS}))/N_{CS} \rfloor - \overline{\overline{n}}_{shift}^{RA}$$

$$\overline{\overline{\overline{d}}}_{start} = N_{ZC} - 2d_u + n_{group}^{RA} \cdot d_{start} + \overline{\overline{n}}_{shift}^{RA} N_{CS},$$

where $d_u$ satisfies:

$$d_u = \begin{cases} p & 0 \le p < N_{ZC}/2 \\ N_{ZC} - p & \text{otherwise(otherwise)} \end{cases},$$

and
p is defined as a smallest nonnegative integer that satisfies $(p \times u) \bmod N_{ZC}=1$.

According to a ninth aspect, an embodiment of this application provides a method for sending a random access preamble sequence. The method includes:

sending, by a terminal device, a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \le n \le N_{ZC} - 1, N_{ZC}$$

is a sequence length of $x_u(n)$, mod represents a modulo operation, and
$C_v$ satisfies:

where $N_{CS}$ is an integer; and
for $$\frac{2}{7} N_{ZC} \le d_u \le \frac{N_{ZC} - N_{CS}}{3}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{N_{ZC} - 3d_u}{N_{CS}} \right\rfloor$$

where $d_u$ satisfies:

$$d_{start} = N_{ZC} - 3d_u + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, N_{ZC} - 3d_u - \overline{n}_{shift}^{RA} N_{CS})/N_{CS} \rfloor$$

$$\overline{d}_{start} = d_u + n_{group}^{RA} \cdot d_{start} + \overline{n}_{shift}^{RA} N_{CS}$$

$$\overline{\overline{\overline{n}}}_{shift}^{RA} = 0, \overline{\overline{d}}_{start} = 0,$$

$$d_u = \begin{cases} p & 0 \le p < N_{ZC}/2 \\ N_{ZC} - p & \text{otherwise (otherwise)} \end{cases}$$

and
p is defined as a smallest nonnegative integer that satisfies $(p \times u) \bmod N_{ZC}=1$.

When the terminal device sends the random access preamble sequence according to the foregoing method, a success rate of random access can be improved.

According to a tenth aspect, an embodiment of this application provides a method for receiving a random access preamble sequence. The method includes:

receiving, by a base station, a random access preamble sequence signal based on a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \le n \le N_{ZC} - 1, N_{ZC}$$

$$C_v = \begin{cases} d_{start} \lfloor v/n_{shift}^{RA} \rfloor + (v \bmod n_{shift}^{RA}) N_{CS} & v = 0, 1, \ldots, n_{group}^{RA} n_{shift}^{RA} + \overline{n}_{shift}^{RA} - 1 \\ \overline{d}_{start} + (v - n_{shift}^{RA} n_{group}^{RA} - \overline{n}_{shift}^{RA}) N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{d}}_{start} + (v - n_{shift}^{RA} n_{group}^{RA} - \overline{n}_{shift}^{RA} - \overline{\overline{n}}_{shift}^{RA}) N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1, \end{cases}$$

is a sequence length of $x_u(n)$, mod represents a modulo operation, and
$C_v$ satisfies:

$$C_v = \begin{cases} d_{start}\lfloor v/n_{shift}^{RA}\rfloor + (v \bmod n_{shift}^{RA})N_{CS} & v = 0, 1, \ldots, n_{group}^{RA}n_{shift}^{RA} + \overline{n}_{shift}^{RA} - 1 \\ \overline{\overline{d}}_{start} + (v - n_{shift}^{RA}n_{group}^{RA} - \overline{n}_{shift}^{RA})N_{CS} & v = n_{shift}^{RA}n_{group}^{RA} + \overline{n}_{shift}^{RA}, \ldots, n_{group}^{RA}n_{group}^{RA} + \overline{n}_{shift}^{RA} + \overline{\overline{n}}_{shift}^{RA} - 1 \\ \overline{\overline{\overline{d}}}_{start} + (v - n_{shift}^{RA}n_{group}^{RA} - \overline{n}_{shift}^{RA} - \overline{\overline{n}}_{shift}^{RA})N_{CS} & v = n_{shift}^{RA}n_{group}^{RA} + \overline{n}_{shift}^{RA} + \overline{\overline{n}}_{shift}^{RA}, \ldots, n_{shift}^{RA}n_{group}^{RA} + \overline{n}_{shift}^{RA} + \overline{\overline{n}}_{shift}^{RA} + \overline{\overline{\overline{n}}}_{shift}^{RA} - 1, \end{cases}$$

where $N_{CS}$ is an integer; and
for $$\frac{2}{7}N_{ZC} \le d_u \le \frac{N_{ZC} - N_{CS}}{3}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{\overline{d}}_{start}, \text{ and } \overline{\overline{\overline{d}}}_{start}$$

satisfy:

$$n_{shift}^{R4} = \left\lfloor \frac{N_{ZC} - 3d_u}{N_{CS}} \right\rfloor$$

where $d_u$ satisfies:

$$d_{start} = N_{ZC} - 3d_u + n_{shift}^{RA} \cdot N_{CS}$$

$$n_{group}^{RA} = \left\lfloor \frac{d_u}{d_{start}} \right\rfloor$$

-continued $$\overline{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, N_{ZC} - 3d_u - \overline{n}_{shift}^{RA}N_{CS})/N_{CS} \rfloor$$

$$\overline{\overline{d}}_{start} = d_u + n_{group}^{RA} \cdot d_{start} + \overline{n}_{shift}^{RA}N_{CS}$$

$$\overline{\overline{\overline{n}}}_{shift}^{RA} = 0, \overline{\overline{\overline{d}}}_{start} = 0,$$

$$d_u = \begin{cases} p & 0 \le p < N_{ZC}/2 \\ N_{ZC} - p & \text{otherwise (otherwise)} \end{cases}$$

and
p is defined as a smallest nonnegative integer that satisfies $(p \times u) \bmod N_{ZC} = 1$.

The base station receives the random access preamble sequence according to the foregoing method. Therefore, when different terminal devices simultaneously send random access preamble sequences and the random access preamble sequences of the different terminal devices correspond to different $C_v$, mutual interference between the terminal devices can be avoided, thereby improving a success rate of random access.

According to an eleventh aspect, an embodiment of this application provides a terminal device. The terminal device has a function of implementing behavior of the terminal device in the foregoing method. The function may be implemented by hardware or may be implemented by hardware by executing corresponding software. The hardware or software includes one or more modules corresponding to the foregoing function. The modules may be software and/or hardware.

The terminal device includes: a processing unit, configured to determine a random access preamble sequence $x_{u,v}(n)$, where $x_{u,v}(n)$ satisfies $x_{u,v}(n) = x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \le n \le N_{ZC} - 1, N_{ZC}$$

is a sequence length of $x_u(n)$, mod represents a modulo operation, and
$C_v$ satisfies:

$$C_v = \begin{cases} d_{start}\lfloor v/n_{shift}^{RA}\rfloor + (v \bmod n_{shift}^{RA})N_{CS} & v = 0, 1, \ldots, n_{group}^{RA}n_{shift}^{RA} + \overline{n}_{shift}^{RA} - 1 \\ \overline{\overline{d}}_{start} + (v - n_{shift}^{RA}n_{group}^{RA} - \overline{n}_{shift}^{RA})N_{CS} & v = n_{shift}^{RA}n_{group}^{RA} + \overline{n}_{shift}^{RA}, \ldots, n_{group}^{RA}n_{group}^{RA} + \overline{n}_{shift}^{RA} + \overline{\overline{n}}_{shift}^{RA} - 1 \\ \overline{\overline{\overline{d}}}_{start} + (v - n_{shift}^{RA}n_{group}^{RA} - \overline{n}_{shift}^{RA} - \overline{\overline{n}}_{shift}^{RA})N_{CS} & v = n_{shift}^{RA}n_{group}^{RA} + \overline{n}_{shift}^{RA} + \overline{\overline{n}}_{shift}^{RA}, \ldots, n_{shift}^{RA}n_{group}^{RA} + \overline{n}_{shift}^{RA} + \overline{\overline{n}}_{shift}^{RA} + \overline{\overline{\overline{n}}}_{shift}^{RA} - 1, \end{cases}$$

where $N_{CS}$ is an integer; and
for $$\frac{2}{7}N_{ZC} \le d_u \le \frac{N_{ZC} - N_{CS}}{3}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{\overline{d}}_{start}, \text{ and } \overline{\overline{\overline{d}}}_{start}$$

satisfy:

$$n_{shift}^{R4} = \left\lfloor \frac{N_{ZC} - 3d_u}{N_{CS}} \right\rfloor$$

where $d_u$ satisfies:

$$d_{start} = N_{ZC} - 3d_u + n_{shift}^{RA} \cdot N_{CS}$$

$$n_{group}^{RA} = \left\lfloor \frac{d_u}{d_{start}} \right\rfloor$$

-continued $$\overline{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\overline{\overline{n}}_{shift}^{RA} = \left\lfloor \min\left(d_u - n_{group}^{RA} \cdot d_{start}, N_{ZC} - 3d_u - \overline{n}_{shift}^{RA} N_{CS}\right) / N_{CS} \right\rfloor$$

$$\overline{\overline{d}}_{start} = d_u + n_{group}^{RA} \cdot d_{start} + \overline{n}_{shift}^{RA} N_{CS}$$

$$\overline{\overline{n}}_{shift}^{RA} = 0, \overline{\overline{d}}_{start} = 0,$$

$$d_u = \begin{cases} p & 0 \le p < N_{ZC}/2 \\ N_{ZC} - p & \text{otherwise (otherwise)} \end{cases}$$

and
  p is defined as a smallest nonnegative integer that satisfies $(p \times u) \bmod N_{ZC} = 1$; and
  a sending unit, configured to send $x_{u,v}(n)$.

According to a twelfth aspect, an embodiment of this application provides a base station. The base station has a function of implementing behavior of the base station in the foregoing method. The function may be implemented by hardware or may be implemented by hardware by executing corresponding software. The hardware or software includes one or more modules corresponding to the foregoing function.

The Base Station Includes:
  a receiving unit, configured to receive a random access preamble sequence signal; and
  a processing unit, configured to process the random access preamble sequence signal based on a random access preamble sequence $x_{u,v}(n)$, where $x_{u,v}(n)$ satisfies $x_{u,v}(n) = x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \le n \le N_{ZC} - 1, N_{ZC}$$

is a sequence length of $x_u(n)$, mod represents a modulo operation, and
  $C_v$ satisfies:

where $N_{CS}$ is an integer; and
  for $$\frac{2}{7}N_{ZC} \le d_u \le \frac{N_{ZC} - N_{CS}}{3}, n_{shift}^{RA}, d_{start},$$

$$n_{group}^{RA}, \overline{n}_{shift}^{RA}, \overline{\overline{n}}_{shift}^{RA}, \overline{d}_{start}, \text{ and } \overline{\overline{d}}_{start}$$

satisfy:

$$n_{shift}^{RA} = \left\lfloor \frac{N_{ZC} - 3d_u}{N_{CS}} \right\rfloor$$

where $d_u$ satisfies:

$$d_{start} = N_{ZC} - 3d_u + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\overline{\overline{n}}_{shift}^{RA} = \left\lfloor \min\left(d_u - n_{group}^{RA} \cdot d_{start}, N_{ZC} - 3d_u - \overline{n}_{shift}^{RA} N_{CS}\right) / N_{CS} \right\rfloor$$

$$\overline{d}_{start} = d_u + n_{group}^{RA} \cdot d_{start} + \overline{n}_{shift}^{RA} N_{CS}$$

$$\overline{\overline{n}}_{shift}^{RA} = 0, \overline{\overline{d}}_{start} = 0,$$

$$d_u = \begin{cases} p & 0 \le p < N_{ZC}/2 \\ N_{ZC} - p & \text{otherwise (otherwise)} \end{cases},$$

and
  p is defined as a smallest nonnegative integer that satisfies $(p \times u) \bmod N_{ZC} = 1$.

According to a thirteenth aspect, an embodiment of this application provides a method for sending a random access preamble sequence. The method includes:
  sending, by a terminal device, a random access preamble sequence $x_{u,v}(n)$, where $x_{u,v}(n)$ satisfies $x_{u,v}(n) = x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \le n \le N_{ZC} - 1, N_{ZC}$$

is a sequence length of $x_u(n)$, mod represents a modulo operation, and $C_v$ satisfies:

$$C_v = \begin{cases} d_{start}\lfloor v/n_{shift}^{RA} \rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{d}_{start} + (v - n_{shift}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{d}}_{start} + (v - n_{shift}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} - 1, \end{cases}$$

$$C_v = \begin{cases} d_{start}\lfloor v/n_{shift}^{RA} \rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{d}_{start} + (v - n_{shift}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{d}}_{start} + (v - n_{shift}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1, \end{cases}$$

where $N_{CS}$ is an integer; and
for $$\frac{N_{ZC} - N_{CS}}{3} \le d_u < \frac{2N_{ZC}}{5}, n_{shift}^{RA}, d_{start},$$

$$n_{group}^{RA} \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left( \left\lfloor \frac{N_{ZC} - 2d_u - n_{group}^{RA} \cdot d_{start}}{N_{CS}} \right\rfloor, 0 \right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0,$$

where $d_u$ satisfies:

$$d_u = \begin{cases} p & 0 \le p < N_{ZC}/2 \\ N_{ZC} - p & \text{otherwise (otherwise)} \end{cases}$$

and
p is defined as a smallest nonnegative integer that satisfies $(p \times u) \bmod N_{ZC} = 1$.

When the terminal device sends the random access preamble sequence according to the foregoing method, a success rate of random access can be improved.

According to a fourteenth aspect, an embodiment of this application provides a method for receiving a random access preamble sequence. The method includes:
receiving, by a base station, a random access preamble sequence signal based on a random access preamble sequence $x_{u,v}(n)$, where $x_{u,v}(n)$ satisfies $x_{u,v}(n) = x_u((n + C_v) \bmod N_{ZC})$, a ZC (Zadoff-Chu) sequence whose root sequence number is u is define as:

$$x_u(n) = e^{-j\frac{\pi u n(n+1)}{N_{ZC}}}, 0 \le n \le N_{ZC} - 1, N_{ZC}$$

is a sequence length of $x_u(n)$, mod represents a modulo operation, and $C_v$ satisfies:

where $N_{CS}$ is an integer; and
for $$\frac{N_{ZC} - N_{CS}}{3} \le d_u < \frac{2N_{ZC}}{5}, n_{shift}^{RA}, d_{start},$$

$$n_{group}^{RA} \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left( \left\lfloor \frac{N_{ZC} - 2d_u - n_{group}^{RA} \cdot d_{start}}{N_{CS}} \right\rfloor, 0 \right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0,$$

where $d_u$ satisfies:

$$d_u = \begin{cases} p & 0 \le p < N_{ZC}/2 \\ N_{ZC} - p & \text{otherwise (otherwise)} \end{cases},$$

p is defined as a smallest nonnegative integer that satisfies $(p \times u) \bmod N_{ZC} = 1$.

The base station receives the random access preamble sequence according to the foregoing method. Therefore, when different terminal devices simultaneously send random access preamble sequences and the random access preamble sequences of the different terminal devices correspond to different $C_v$, mutual interference between the terminal devices can be avoided, thereby improving a success rate of random access.

According to a fifteenth aspect, an embodiment of this application provides a terminal device. The terminal device has a function of implementing behavior of the terminal device in the foregoing method. The function may be implemented by hardware or may be implemented by hardware by executing corresponding software. The hardware or software includes one or more modules corresponding to the foregoing function. The modules may be software and/or hardware.

$$C_v = \begin{cases} d_{start}\lfloor v/n_{shift}^{RA} \rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{d}_{start} + (v - n_{shift}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{d}}_{start} + (v - n_{shift}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1, \end{cases}$$

The Terminal Device Includes:
a processing unit, configured to determine a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \leq n \leq N_{ZC}-1, N_{ZC}$$

is a sequence length of $x_u(n)$, mod represents a modulo operation, and $C_v$ satisfies:

$$C_v = \begin{cases} d_{start}\lfloor v/n_{shift}^{RA}\rfloor + (v \bmod n_{shift}^{RA})N_{CS} & v = 0, 1, \ldots, n_{group}^{RA}n_{shift}^{RA} + \bar{n}_{shift}^{RA} - 1 \\ \bar{d}_{start} + (v - n_{shift}^{RA}n_{group}^{RA} - \bar{n}_{shift}^{RA})N_{CS} & v = n_{shift}^{RA}n_{group}^{RA} + \bar{n}_{shift}^{RA}, \ldots, n_{shift}^{RA}n_{group}^{RA} + \bar{n}_{shift}^{RA} + \bar{\bar{n}}_{shift}^{RA} - 1 \\ \bar{\bar{d}}_{start} + (v - n_{shift}^{RA}n_{group}^{RA} - \bar{n}_{shift}^{RA} - \bar{\bar{n}}_{shift}^{RA})N_{CS} & v = n_{shift}^{RA}n_{group}^{RA} + \bar{n}_{shift}^{RA} + \bar{\bar{n}}_{shift}^{RA}, \ldots, n_{shift}^{RA}n_{group}^{RA} + \bar{n}_{shift}^{RA} + \bar{\bar{n}}_{shift}^{RA} + \bar{\bar{\bar{n}}}_{shift}^{RA} - 1, \end{cases}$$

where $N_{CS}$ is an integer; and
for $$\frac{N_{ZC}+N_{CS}}{3} \leq d_u < \frac{2N_{ZC}}{5}, n_{shift}^{RA}, d_{start},$$

$$n_{group}^{RA}, \bar{n}_{shift}^{RA}, \bar{\bar{n}}_{shift}^{RA}, \bar{\bar{\bar{n}}}_{shift}^{RA}, \bar{d}_{start}, \text{ and } \bar{\bar{d}}_{start}$$

satisfy:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor$$

$$\bar{n}_{shift}^{RA} = \max\left(\left\lfloor \frac{N_{ZC} - 2d_u - n_{group}^{RA}d_{start}}{N_{CS}} \right\rfloor, 0\right)$$

$$\bar{\bar{n}}_{shift}^{RA} = 0, \bar{d}_{start} = 0, \bar{\bar{\bar{n}}}_{shift}^{RA} = 0, \bar{\bar{d}}_{start} = 0,$$

where $d_u$ satisfies:

$$d_u = \begin{cases} p & 0 \leq p < N_{ZC}/2 \\ N_{ZC} - p & \text{otherwise (otherwise)} \end{cases},$$

and
p is defined as a smallest nonnegative integer that satisfies $(p \times u) \bmod N_{ZC}=1$; and
a sending unit, configured to send $x_{u,v}(n)$.

According to a sixteenth aspect, an embodiment of this application provides a base station. The base station has a function of implementing behavior of the base station in the foregoing method. The function may be implemented by hardware or may be implemented by hardware by executing corresponding software. The hardware or software includes one or more modules corresponding to the foregoing function.

The Base Station Includes:
a receiving unit, configured to receive a random access preamble sequence signal; and
a processing unit, configured to process the random access preamble sequence signal based on a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \leq n \leq N_{ZC}-1, N_{ZC}$$

is a sequence length of $x_u(n)$, mod represents a modulo operation, and $C_v$ satisfies:

$$C_v = \begin{cases} d_{start}\lfloor v/n_{shift}^{RA}\rfloor + (v \bmod n_{shift}^{RA})N_{CS} & v = 0, 1, \ldots, n_{group}^{RA}n_{shift}^{RA} + \bar{n}_{shift}^{RA} - 1 \\ \bar{d}_{start} + (v - n_{shift}^{RA}n_{group}^{RA} - \bar{n}_{shift}^{RA})N_{CS} & v = n_{shift}^{RA}n_{group}^{RA} + \bar{n}_{shift}^{RA}, \ldots, n_{shift}^{RA}n_{group}^{RA} + \bar{n}_{shift}^{RA} + \bar{\bar{n}}_{shift}^{RA} - 1 \\ \bar{\bar{d}}_{start} + (v - n_{shift}^{RA}n_{group}^{RA} - \bar{n}_{shift}^{RA} - \bar{\bar{n}}_{shift}^{RA})N_{CS} & v = n_{shift}^{RA}n_{group}^{RA} + \bar{n}_{shift}^{RA} + \bar{\bar{n}}_{shift}^{RA}, \ldots, n_{shift}^{RA}n_{group}^{RA} + \bar{n}_{shift}^{RA} + \bar{\bar{n}}_{shift}^{RA} + \bar{\bar{\bar{n}}}_{shift}^{RA} - 1, \end{cases}$$

where $N_{CS}$ is an integer; and
for $$\frac{N_{ZC}+N_{CS}}{3} \leq d_u < \frac{2N_{ZC}}{5}, n_{shift}^{RA}, d_{start},$$

$$n_{group}^{RA}, \bar{n}_{shift}^{RA}, \bar{\bar{n}}_{shift}^{RA}, \bar{\bar{\bar{n}}}_{shift}^{RA}, \bar{d}_{start}, \text{ and } \bar{\bar{d}}_{start}$$

satisfy:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor$$

$$\bar{n}_{shift}^{RA} = \max\left(\left\lfloor \frac{N_{ZC} - 2d_u - n_{group}^{RA}d_{start}}{N_{CS}} \right\rfloor, 0\right)$$

$$\bar{\bar{n}}_{shift}^{RA} = 0, \bar{d}_{start} = 0, \bar{\bar{\bar{n}}}_{shift}^{RA} = 0, \bar{\bar{d}}_{start} = 0,$$

where $d_u$ satisfies:

$$d_u = \begin{cases} p & 0 \le p < N_{ZC}/2 \\ N_{ZC} - p & \text{otherwise (otherwise)} \end{cases},$$

and p is defined as a smallest nonnegative integer that satisfies $(p \times u) \bmod N_{ZC} = 1$.

According to a seventeenth aspect, an embodiment of this application provides a method for sending a random access preamble sequence. The method includes:

sending, by a terminal device, a random access preamble sequence $x_{u,v}(n)$, where $x_{u,v}(n)$ satisfies $x_{u,v}(n) = x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \le n \le N_{ZC} - 1, N_{ZC}$$

is a sequence length of $x_u(n)$, mod represents a modulo operation, and $C_v$ satisfies:

$$C_v = \begin{cases} d_{start}\lfloor v/n_{shift}^{RA} \rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{d}_{start} + (v - n_{shift}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{d}}_{start} + (v - n_{shift}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1, \end{cases}$$

where $N_{CS}$ is an integer; and for $$\frac{N_{ZC} + N_{CS}}{3} \le d_u < \frac{2N_{ZC}}{5}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy $$n_{shift}^{RA} = \left\lfloor \frac{3d_u - N_{ZC}}{N_{CS}} \right\rfloor$$

$$d_{start} = 2(N_{ZC} + 2d_u) + n_{shift}^{RA} \cdot N_{CS}$$

$$n_{group}^{RA} = \left\lfloor \frac{N_{ZC} - d_u}{d_{start}} \right\rfloor$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0,$$

where $d_u$ satisfies:

$$d_u = \begin{cases} p & 0 \le p < N_{ZC}/2 \\ N_{ZC} - p & \text{otherwise (otherwise)} \end{cases},$$

and p is defined as a smallest nonnegative integer that satisfies $(p \times u) \bmod N_{ZC} = 1$.

When the terminal device sends the random access preamble sequence according to the foregoing method, a success rate of random access can be improved.

According to an eighteenth aspect, an embodiment of this application provides a method for receiving a random access preamble sequence. The method includes:

receiving, by a base station, a random access preamble sequence signal based on a random access preamble sequence $x_{u,v}(n)$, where $x_{u,v}(n)$ satisfies $x_{u,v}(n) = x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \le n \le N_{ZC} - 1, N_{ZC}$$

is a sequence length of $x_u(n)$, mod represents a modulo operation, and $C_v$ satisfies:

$$C_v = \begin{cases} d_{start}\lfloor v/n_{shift}^{RA} \rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{d}_{start} + (v - n_{start}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{d}}_{start} + (v - n_{start}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1 \end{cases},$$

where $N_{CS}$ is an integer; and
for $$\frac{2N_{ZC}}{5} \leq d_u \leq \frac{N_{ZC}-N_{CS}}{2}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$C_v = \begin{cases} d_{start}\lfloor v/n_{shift}^{RA}\rfloor + (v \bmod n_{shift}^{RA})N_{CS} & v = 0, 1, \ldots, n_{group}^{RA}n_{shift}^{RA} + \overline{n}_{shift}^{RA} - 1 \\ \overline{d}_{start} + (v - n_{start}^{RA}n_{group}^{RA} - \overline{n}_{shift}^{RA})N_{CS} & v = n_{shift}^{RA}n_{group}^{RA} + \overline{n}_{shift}^{RA}, \ldots, n_{shift}^{RA}n_{group}^{RA} + \overline{n}_{shift}^{RA} + \overline{\overline{n}}_{shift}^{RA} - 1 \\ \overline{\overline{d}}_{start} + (v - n_{start}^{RA}n_{group}^{RA} - \overline{n}_{shift}^{RA} - \overline{\overline{n}}_{shift}^{RA})N_{CS} & v = n_{shift}^{RA}n_{group}^{RA} + \overline{n}_{shift}^{RA} + \overline{\overline{n}}_{shift}^{RA}, \ldots, n_{shift}^{RA}n_{group}^{RA} + \overline{n}_{shift}^{RA} + \overline{\overline{n}}_{shift}^{RA} + \overline{\overline{\overline{n}}}_{shift}^{RA} - 1 \end{cases},$$

$$n_{shift}^{RA} = \left\lfloor \frac{N_{ZC}-2d_u}{N_{CS}} \right\rfloor$$

$$d_{start} = 2(N_{ZC}-2d_u) + n_{shift}^{RA} \cdot N_{CS}$$

$$n_{group}^{RA} = \left\lfloor \frac{N_{ZC}-d_u}{d_{start}} \right\rfloor$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0,$$

where $d_u$ satisfies:

$$d_u = \begin{cases} p & 0 \leq p < N_{ZC}/2 \\ N_{ZC} - p & \text{otherwise (otherwise)} \end{cases},$$

and
p is defined as a smallest nonnegative integer that satisfies $(p \times u) \bmod N_{ZC}=1$.

The base station receives the random access preamble sequence according to the foregoing method. Therefore, when different terminal devices simultaneously send random access preamble sequences and the random access preamble sequences of the different terminal devices correspond to different $C_v$, mutual interference between the terminal devices can be avoided, thereby improving a success rate of random access.

According to a nineteenth aspect, an embodiment of this application provides a terminal device. The terminal device has a function of implementing behavior of the terminal device in the foregoing method. The function may be implemented by hardware or may be implemented by hardware by executing corresponding software. The hardware or software includes one or more modules corresponding to the foregoing function. The modules may be software and/or hardware.

The terminal device includes: a processing unit, configured to determine a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \leq n \leq N_{ZC}-1, N_{ZC}$$

is a sequence length of $x_u(n)$, mod represents a modulo operation, and $C_v$ satisfies:

$$C_v = \begin{cases} d_{start}\lfloor v/n_{shift}^{RA}\rfloor + (v \bmod n_{shift}^{RA})N_{CS} & v = 0, 1, \ldots, n_{group}^{RA}n_{shift}^{RA} + \overline{n}_{shift}^{RA} - 1 \\ \overline{d}_{start} + (v - n_{start}^{RA}n_{group}^{RA} - \overline{n}_{shift}^{RA})N_{CS} & v = n_{shift}^{RA}n_{group}^{RA} + \overline{n}_{shift}^{RA}, \ldots, n_{shift}^{RA}n_{group}^{RA} + \overline{n}_{shift}^{RA} + \overline{\overline{n}}_{shift}^{RA} - 1 \\ \overline{\overline{d}}_{start} + (v - n_{start}^{RA}n_{group}^{RA} - \overline{n}_{shift}^{RA} - \overline{\overline{n}}_{shift}^{RA})N_{CS} & v = n_{shift}^{RA}n_{group}^{RA} + \overline{n}_{shift}^{RA} + \overline{\overline{n}}_{shift}^{RA}, \ldots, n_{shift}^{RA}n_{group}^{RA} + \overline{n}_{shift}^{RA} + \overline{\overline{n}}_{shift}^{RA} + \overline{\overline{\overline{n}}}_{shift}^{RA} - 1 \end{cases},$$

where $N_{CS}$ is an integer; and
for $$\frac{2N_{ZC}}{5} \leq d_u \leq \frac{N_{ZC}-N_{CS}}{2}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{N_{ZC}-2d_u}{N_{CS}} \right\rfloor$$

$$d_{start} = 2(N_{ZC}-2d_u) + n_{shift}^{RA} \cdot N_{CS}$$

$$n_{group}^{RA} = \left\lfloor \frac{N_{ZC}-d_u}{d_{start}} \right\rfloor$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0,$$

where $d_u$ satisfies:

$$d_u = \begin{cases} p & 0 \leq p < N_{ZC}/2 \\ N_{ZC} - p & \text{otherwise (otherwise)} \end{cases},$$

p is defined as a smallest nonnegative integer that satisfies $(p \times u) \bmod N_{ZC}=1$; and
a sending unit, configured to send $x_{u,v}(n)$.

According to a twentieth aspect, an embodiment of this application provides a base station. The base station has a function of implementing behavior of the base station in the foregoing method. The function may be implemented by hardware or may be implemented by hardware by executing corresponding software. The hardware or software includes one or more modules corresponding to the foregoing function.

The Base Station Includes:
  a receiving unit, configured to receive a random access preamble sequence signal; and
  a processing unit, configured to process the random access preamble sequence signal based on a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is define as:

$$x_u(n) = e^{-j\frac{\pi u n(n+1)}{N_{ZC}}}, 0 \le n \le N_{ZC} - 1, N_{ZC}$$

is a sequence length of $x_u(n)$, mod represents a modulo operation, and $C_v$ satisfies:

$$C_v = \begin{cases} d_{start}\lfloor v/n_{shift}^{RA}\rfloor + (v \bmod n_{shift}^{RA})N_{CS} & v = 0, 1, \dots, n_{group}^{RA}n_{shift}^{RA} + \overline{n}_{shift}^{RA} - 1 \\ \overline{d}_{start} + (v - n_{start}^{RA}n_{group}^{RA} - \overline{n}_{shift}^{RA})N_{CS} & v = n_{shift}^{RA}n_{group}^{RA} + \overline{n}_{shift}^{RA}, \dots, n_{shift}^{RA}n_{group}^{RA} + \overline{n}_{shift}^{RA} + \overline{\overline{n}}_{shift}^{RA} - 1 \\ \overline{\overline{d}}_{start} + (v - n_{start}^{RA}n_{group}^{RA} - \overline{n}_{shift}^{RA} - \overline{\overline{n}}_{shift}^{RA})N_{CS} & v = n_{shift}^{RA}n_{group}^{RA} + \overline{n}_{shift}^{RA} + \overline{\overline{n}}_{shift}^{RA}, \dots, n_{shift}^{RA}n_{group}^{RA} + \overline{n}_{shift}^{RA} + \overline{\overline{n}}_{shift}^{RA} + \overline{\overline{\overline{n}}}_{shift}^{RA} - 1 \end{cases},$$

where $N_{CS}$ is an integer; and
for $$\frac{2N_{ZC}}{5} \le d_u \le \frac{N_{ZC} - N_{CS}}{2}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{N_{ZC} - 2d_u}{N_{CS}} \right\rfloor$$

$$d_{start} = 2(N_{ZC} - 2d_u) + n_{shift}^{RA} \cdot N_{CS}$$

$$n_{group}^{RA} = \left\lfloor \frac{N_{ZC} - d_u}{d_{start}} \right\rfloor$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0,$$

where $d_u$ satisfies:

$$d_u = \begin{cases} p & 0 \le p < N_{ZC}/2 \\ N_{ZC} - p & \text{otherwise (otherwise)} \end{cases},$$

and
  p is defined as a smallest nonnegative integer that satisfies $(p \times u) \bmod N_{ZC}=1$.

In the third aspect, the fourth aspect, the seventh aspect, the eighth aspect, the tenth aspect, the twelfth aspect, the fifteenth aspect, the sixteenth aspect, the nineteenth aspect, and the twentieth aspect, the sending unit may be a transmitter, the receiving unit may be a receiver, and the processing unit may be a processor.

An embodiment of the present invention further provides a system. The system includes the terminal device and the base station in the foregoing embodiments.

Compared with the prior art, when the terminal device performs uplink random access, mutual interference caused due to impact of a Doppler frequency shift can be avoided by using the solutions provided in this application. When the base station detects the received random access preamble sequence, a vagueness problem during detection can be avoided by using the solutions provided in this application. In this way, the solutions provided in this application can improve a success rate of random access and reduce a random access time.

DETAILED DESCRIPTION OF ILLUSTRATIVE EMBODIMENTS

A network architecture and a service scenario that are described in the embodiments of the present invention are intended to describe the technical solutions in the embodiments of the present invention more clearly, and do not constitute any limitation on the technical solutions provided in the embodiments of the present invention. A person of ordinary skill in the art may learn that with evolution of network architectures and emergence of new service scenarios, the technical solutions provided in the embodiments of the present invention are also applicable to similar technical problems.

It should be understood that the technical solutions in the embodiments of the present invention may be applied to various communications systems, for example, a Long Term Evolution (LTE) system, an LTE frequency division duplex (FDD) system, and an LTE time division duplex (TDD) communications system.

It should also be understood that in the embodiments of the present invention, a terminal device may be referred to as a terminal, user equipment (UE), a mobile station (MS), a mobile terminal, a laptop computer, or the like. The terminal device may communicate with one or more core networks by using a radio access network (RAN). For example, the terminal device may be a mobile phone (also referred to as a "cellular" phone) or a computer with a mobile terminal. For example, the terminal device may also be a portable, pocket-sized, handheld, computer built-in, or in-vehicle mobile apparatus, which exchanges voice and/or data with the radio access network.

In the embodiments of the present invention, a base station may be an evolved NodeB (evolved NodeB, "eNB" or "e-NodeB") in an LTE system, or another base station, or an access network device such as a relay. This is not limited in the present invention.

Figure 1:
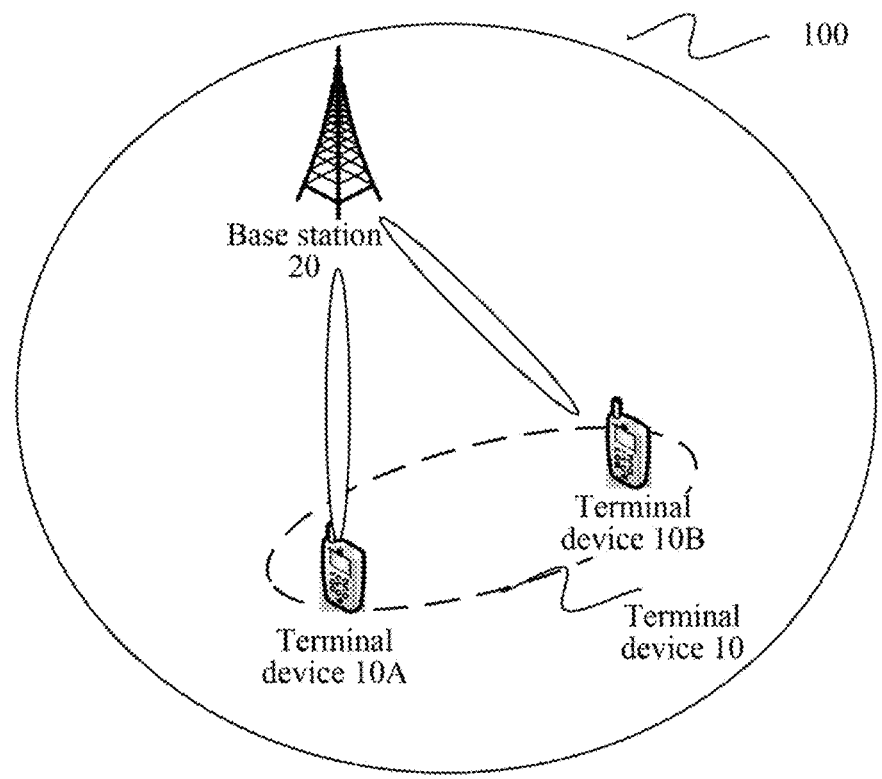
FIG. 1 is a schematic diagram of a communications system according to an embodiment of the present invention.

An embodiment of the present invention provides a solution based on a communications system shown in FIG. 1, to improve uplink random access performance of a terminal device, for example, improve a success rate of random access and reduce a random access time. This embodiment of the present invention provides a communications system 100. The communications system 100 includes at least one base station and a plurality of terminal devices. The plurality of terminal devices communicate with the base station. Using FIG. 1 as an example, a base station 20 communicates with a terminal device 10. In downlink, the base station communicates with the terminal device at least by using a common channel and a downlink service channel. In uplink, the terminal device communicates with the base station by using an uplink random access channel, an uplink control channel, and an uplink service channel. The downlink is a direction in which the base station sends data to the terminal device, and the uplink is a direction in which the terminal device sends data to the base station.

To implement uplink synchronization, the terminal device sends a random access preamble sequence on a physical random access channel (PRACH). The base station identifies the terminal device and obtains transmission timing of the terminal device by detecting the random access preamble sequence sent by the terminal device. The random access preamble sequence sent by the terminal device is a random access preamble sequence randomly selected from a random access preamble sequence set, or the base station notifies the terminal device of a specific random access preamble sequence to be used. The random access preamble sequence is obtained by performing a cyclic shift on one or more Zadoff-Chu sequences. For the random access preamble sequence randomly selected by the terminal device, because the sequence is unknown to the base station, the base station detects, by using a detection method, each random access preamble sequence in the random access preamble sequence set and the received random access preamble sequence sent by the terminal device, to determine the random access preamble sequence sent by the terminal device.

In a high-speed scenario, when a Doppler frequency shift is greater than one time a PRACH subcarrier spacing and less than twice the PRACH subcarrier spacing, during receiving of the base station, for a random access preamble sequence $x_u(n)$ whose root sequence number is u, peak values may be generated at five shift positions: $-d_u$, $-2d_u$, 0, $d_u$, and $2d_u$.

$d_u$ satisfies:

$$d_u = \begin{cases} p & 0 \le p < N_{ZC}/2 \\ N_{ZC}-p & \text{otherwise (otherwise)} \end{cases}.$$

p is defined as a smallest nonnegative integer that satisfies $(p \times u) \bmod N_{ZC}=1$. A ZC (Zadoff-Chu) sequence whose root sequence number is u is defined as:

$$x_u(n) = e^{-j\frac{\pi u n(n+1)}{N_{ZC}}}, 0 \le n \le N_{ZC}-1, N_{ZC}$$

is a sequence length of $x_u(n)$, and mod represents a modulo operation.

In a discussion about the LTE Release 14, in the R1-1609349 proposal, to avoid mutual interference between a plurality of terminal devices, the following design is provided:

When sending the random access preamble sequence, the terminal device obtains the random access preamble sequence based on a formula $x_{u,v}(n)=x_u((n+C_v) \bmod N_{ZC})$. The ZC (Zadoff-Chu) sequence whose root sequence number is U is defined as:

$$x_u(n) = e^{-j\frac{\pi u n(n+1)}{N_{ZC}}}, 0 \le n \le N_{ZC}-1, N_{ZC}$$

is the sequence length of $x_u(n)$, and the terminal device selects a shift sequence number V within a range from 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$, where a relationship between v and a cyclic shift value $C_v$ satisfies:

$$C_v = \begin{cases} d_{start}\lfloor v/n_{shift}^{RA}\rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{d}_{start} + (v - n_{shift}^{RA} n_{group}^{RA} + \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{d}}_{start} + (v - n_{shift}^{RA} n_{group}^{RA} + \overline{n}_{shift}^{RA} + \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1 \end{cases}$$

That is, when $0 \le v \le (n_{shift}^{RA} n_{group}^{RA} + \overline{n}_{shift}^{RA} - 1a)$, the cyclic shift value $C_v$ satisfies:

$$C_v = d_{start}\lfloor v/n_{shift}^{RA}\rfloor + (v \bmod n_{shift}^{RA})N_{CS}.$$

When $(n_{shift}^{RA} n_{group}^{RA} + \overline{n}_{shift}^{RA} - 1) < v \le (n_{shift}^{RA} n_{group}^{RA} + \overline{n}_{shift}^{RA} + \overline{\overline{n}}_{shift}^{RA} - 1)$, the cyclic shift value $C_v$ satisfies a formula:

$$C_v = \overline{d}_{start} + (v - n_{shift}^{RA} n_{group}^{RA} + \overline{n}_{shift}^{RA})N_{CS}.$$

When $(n_{shift}^{RA} n_{group}^{RA} + \overline{n}_{shift}^{RA} + \overline{\overline{n}}_{shift}^{RA} - 1) < v \le (n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$, the cyclic shift value $C_v$ satisfies:

$$C_v = \overline{\overline{d}}_{start} + (v - n_{shift}^{RA} n_{group}^{RA} + \overline{n}_{shift}^{RA} + \overline{\overline{n}}_{shift}^{RA})N_{CS}.$$

When $N_{CS} \le d_u < N_{ZC}/5$, $n_{shift}^{RA}$, $d_{start}$, $n_{group}^{RA}$, and $\overline{n}_{shift}^{RA}$ satisfy a formula:

$$n_{shift}^{RA} = \lfloor d_u/N_{CS} \rfloor$$

-continued $$d_{start} = 4d_u + n_{shift}^{RA} N_{CS}$$

$$n_{group}^{RA} = \lfloor N_{ZC}/d_{start} \rfloor$$

$$\overline{n}_{shift}^{RA} = \max(\lfloor (N_{ZC} - 4d_u - n_{group}^{RA} d_{start})/N_{CS} \rfloor, 0).$$

When, $N_{ZC}/5 \leq d_u \leq (N_{ZC} - N_{CS})/4$, $n_{shift}^{RA}$, $d_{start}$, $n_{group}^{RA}$, and $\overline{n}_{shift}^{RA}$ satisfy a formula:

$$n_{shift}^{RA} = \lfloor (N_{ZC} - 4d_u)/N_{CS} \rfloor$$

$$d_{start} = N_{ZC} - 4d_u + n_{shift}^{RA} N_{CS}$$

$$n_{group}^{RA} = \lfloor d_u/d_{start} \rfloor$$

$$\overline{n}_{shift}^{RA} = \min(\max(\lfloor (d_u - n_{group}^{RA} d_{start})/N_{CS} \rfloor, 0), n_{shift}^{RA}).$$

When $$\frac{N_{ZC} + N_{CS}}{4} \leq d_u < \frac{2}{7} N_{ZC}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy a formula:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, 4d_u - N_{ZC} - \overline{n}_{shift}^{RA} N_{CS})/N_{CS} \rfloor$$

$$\overline{d}_{start} = N_{ZC} - 3d_u + n_{group}^{RA} \cdot d_{start} + \overline{n}_{shift}^{RA} N_{CS}$$

$$\overline{\overline{\overline{n}}}_{shift}^{RA} = \lfloor ((1 - \min(1, \overline{n}_{shift}^{RA}))(d_u - n_{group}^{RA} \cdot d_{start}) +$$
$$\min(1, \overline{n}_{shift}^{RA})(4d_u - N_{ZC} - \overline{n}_{shift}^{RA} N_{CS}))/N_{CS} \rfloor - \overline{\overline{n}}_{shift}^{RA}$$

$$\overline{\overline{d}}_{start} = N_{ZC} - 2d_u + n_{group}^{RA} \cdot d_{start} + \overline{\overline{n}}_{shift}^{RA} N_{CS}.$$

When $$\frac{2}{7} N_{ZC} \leq d_u \leq \frac{N_{ZC} - N_{CS}}{3}, n_{shift}^{RA}, d_{start}, n_{group}^{RA},$$

$$\overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy a formula:

$$n_{shift}^{RA} = \left\lfloor \frac{N_{ZC} - 3d_u}{N_{CS}} \right\rfloor$$

$$d_{start} = N_{ZC} - 3d_u + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, N_{ZC} - 3d_u - \overline{n}_{shift}^{RA} N_{CS})/N_{CS} \rfloor$$

$$\overline{d}_{start} = d_u + n_{group}^{RA} \cdot d_{start} + \overline{n}_{shift}^{RA} N_{CS}$$

$$\overline{\overline{n}}_{shift}^{RA} = 0, \overline{\overline{d}}_{start} = 0.$$

When $$\frac{N_{ZC} + N_{CS}}{3} \leq d_u < \frac{2N_{ZC}}{5}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy a formula:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 2d_u - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0.$$

When $$\frac{2N_{ZC}}{5} \leq d_u \leq \frac{N_{ZC} - N_{CS}}{2}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy a formula:

$$n_{shift}^{RA} = \left\lfloor \frac{N_{ZC} - 2d_u}{N_{CS}} \right\rfloor$$

$$d_{start} = 2(N_{ZC} - 2d_u) + n_{shift}^{RA} \cdot N_{CS}$$

$$n_{group}^{RA} = \left\lfloor \frac{N_{ZC} - d_u}{d_{start}} \right\rfloor$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0.$$

The terminal device selects one random access preamble sequence from the random access preamble sequence set and sends the random access preamble sequence to the base station. The base station generates a random access preamble sequence by using the same method. All sequences in the random access preamble sequence set and the received random access preamble sequence are detected by using a detection method.

When $C_v$ satisfies the following condition 1 or condition 2, mutual interference between terminal devices is caused, and as a result, random access performance is degraded.

Condition 1: When $(n_{shift}^{RA} n_{group}^{RA} + \bar{n}_{shift}^{RA} - 1) < v \leq (n_{shift}^{RA} n_{group}^{RA} + \bar{n}_{shift}^{RA} + \bar{\bar{n}}_{shift}^{RA} - 1)$, the cyclic shift value $C_v$ satisfies a formula:

$$C_v = \bar{d}_{start} + (v - n_{shift}^{RA} n_{group}^{RA} + \bar{n}_{shift}^{RA}) N_{CS}.$$

Condition 2: When $(n_{shift}^{RA} n_{group}^{RA} + \bar{n}_{shift}^{RA} + \bar{\bar{n}}_{shift}^{RA} - 1) < v \leq (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the cyclic shift value $C_v$ satisfies:

$$C_v = \bar{\bar{d}}_{start} + (v - n_{shift}^{RA} n_{group}^{RA} + \bar{n}_{shift}^{RA} \bar{\bar{n}}_{shift}^{RA}) N_{CS}.$$

Figure 2A:
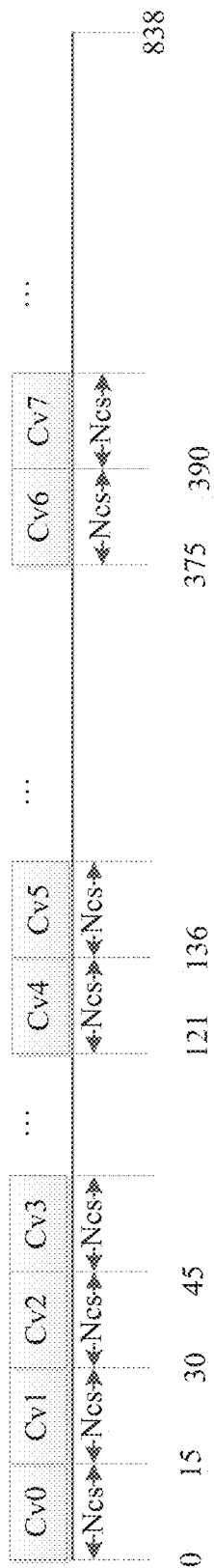
FIG. 2a is a schematic diagram of a terminal device cyclic shift obtained according to the prior art when u=220 and Ncs=15.

For example, parameters of the random access preamble sequence are u=220 and $N_{CS}$=15. As shown in FIG. 2a, a cyclic shift value satisfying the condition 1 is $C_v$=0, 15, 30, 45, 121, 136, 375, 390 in this case, $d_u$=225. When the base station detects a random access preamble sequence whose cyclic shift value is 0, a peak value may occur at positions of 15 shift values starting from a cyclic shift value 389, 614, 0, 225, or 450. When the base station detects a random access preamble sequence whose cyclic shift value is 390, a peak value may occur at positions of 15 shift values starting from a cyclic shift value 779, 165, 390, 615, or 1. The base station cannot learn which random access preamble sequence generates peak values that occur at 14 shift values starting from 390. Consequently, vagueness during detection of the base station and mutual interference between terminal devices are caused. There are a plurality of cases for the mutual interference between the terminal devices. Other cases are similar to the example in which u=220 and $N_{CS}$=15 and are not described in detail again.

The foregoing method is improved during implementation of the present invention. $C_v = \bar{d}_{start} + (v - n_{shift}^{RA} n_{group}^{RA} + \bar{n}_{shift}^{RA}) N_{CS}$ is modified to $C_v = \bar{d}_{start} + (v - n_{shift}^{RA} n_{group}^{RA} - \bar{n}_{shift}^{RA}) N_{CS}$, and $C_v = \bar{\bar{d}}_{start} + (v - n_{shift}^{RA} n_{group}^{RA} + \bar{n}_{shift}^{RA}) N_{CS}$ is modified to $C_v = \bar{\bar{d}}_{start} + (v - n_{shift}^{RA} n_{group}^{RA} - \bar{n}_{shift}^{RA} - \bar{\bar{n}}_{shift}^{RA}) N_{CS}$, to overcome the foregoing problem. Implementations of the present invention are provided in detail below.

Figure 3:
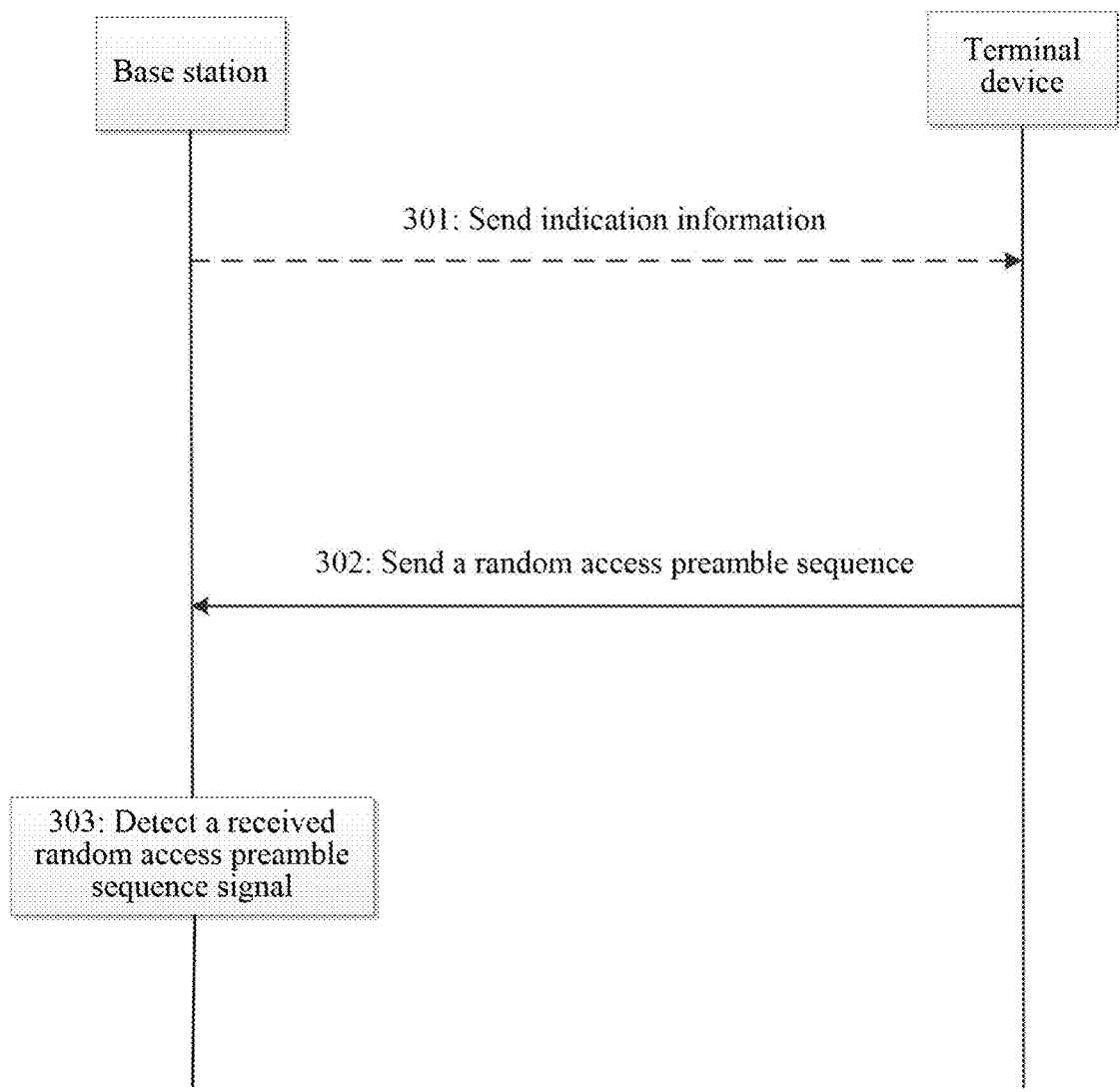
FIG. 3 is a schematic flowchart of a method for sending a random access preamble sequence according to an embodiment of the present invention.

An embodiment of the present invention provides a method for sending a random access preamble sequence. FIG. 3 is a schematic diagram of a method for sending a random access preamble sequence according to an embodiment of the present invention. A base station in FIG. 3 may be the base station 20 in FIG. 1. A terminal device in FIG. 3 may be the terminal device 10 in FIG. 1, namely, a terminal device 10A or a terminal device 10B. As shown in FIG. 3, the method includes the following steps.

Step 301: The base station sends indication information to the terminal device. The indication information may include any one or two of the following two types of indication information: an Ncs index and a logic root sequence number.

Step 301 is an optional step.

Optionally, the indication information is used to indicate an Ncs index used when the terminal device obtains a random access preamble sequence. The indication information indicates the used Ncs index by using signaling zeroCorrelationZoneConfig-r14. A value range of the Ncs index is 0 to 12. A mapping relationship between an Ncs index and an Ncs value is shown in Table 1, Table 2, or Table 3. Using Table 1 as an example, if an Ncs index in notification signaling of the base station is 6, a target Ncs value is 46.

TABLE 1

Mapping table of Ncs indexes and Ncs

| Ncs index | Ncs |
|---|---|
| 0 | 15 |
| 1 | 18 |
| 2 | 22 |
| 3 | 26 |
| 4 | 32 |
| 5 | 38 |
| 6 | 46 |
| 7 | 55 |
| 8 | 68 |
| 9 | 82 |
| 10 | 100 |
| 11 | 128 |
| 12 | 158 |

Using Table 2 as an example, if a target Ncs index in the notification signaling of the base station is 12, a target Ncs value is 137.

TABLE 2

Mapping table of Ncs indexes and Ncs

| Ncs index | Ncs |
|---|---|
| 0 | 15 |
| 1 | 18 |
| 2 | 22 |
| 3 | 26 |
| 4 | 32 |
| 5 | 38 |
| 6 | 46 |
| 7 | 55 |
| 8 | 68 |
| 9 | 82 |
| 10 | 100 |
| 11 | 128 |
| 12 | 137 |

Using Table 3 as an example, if an Ncs index carried in the notification signaling of the base station is 11, Ncs is 118.

TABLE 3

Mapping table of Ncs indexes and Ncs

| Ncs index | Ncs |
|---|---|
| 0 | 15 |
| 1 | 18 |
| 2 | 22 |
| 3 | 26 |
| 4 | 32 |
| 5 | 38 |
| 6 | 46 |
| 7 | 55 |
| 8 | 68 |
| 9 | 82 |
| 10 | 100 |
| 11 | 118 |
| 12 | 137 |

Optionally, the indication information is used to instruct to obtain a starting logic root sequence number of the random access preamble sequence.

Optionally, the notification signaling indicates a logic root sequence number used by the terminal device by using signaling rootSequenceIndex-r14. There is a one-to-one mapping relationship between the logic root sequence number (rootSequenceIndex-r14) and a physical root sequence number u. For example, a logic root sequence number 0 corresponds to a physical root sequence number u=129, and a logic root sequence number 837 corresponds to a physical root sequence number u=610.

Step 302: The terminal device sends a random access preamble sequence.

In step 302, the terminal device sends a random access preamble sequence $x_{u,v}(n)$.

In this embodiment of the present invention, max represents that a maximum value is selected, for example, max(0,1)=1, and max(4,5)=5. min represents that a smallest value is selected, for example, min(0,1)=0, and min(4,5)=4. $\lfloor \gamma \rfloor$ represents rounding down Y to the nearest integer. That is, if $\gamma$ is equal to 2.5, $\lfloor \gamma \rfloor$ is equal to 2. For example, $\lfloor v/n_{shift}^{RA} \rfloor$ represents rounding down $v/n_{shift}^{RA}$ to the nearest integer. mod represents a modulo operation, for example, 4 mod 2=0, and 5 mod 2=1.

Optionally, the terminal device obtains the Ncs value and the physical root sequence number based on the indication information of the base station. The terminal device determines $x_{u,v}(n)$ based on the Ncs value and the physical root sequence number.

$x_{u,v}(n) = x_u((n+C_v) \bmod N_{ZC})$. A ZC (Zadoff-Chu) sequence whose root sequence number is u is defined as:

$$x_u(n) = e^{-j\frac{\pi u n(n+1)}{N_{ZC}}}, 0 \le n \le N_{ZC} - 1, N_{ZC}$$

is a sequence length of $x_u(n)$, and the terminal device selects a shift sequence number v within a range from 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$. A relationship between v and a cyclic shift value $C_v$ satisfies:

$$C_v = \begin{cases} d_{start}\lfloor v/n_{shift}^{RA} \rfloor + (v \bmod n_{shift}^{RA})N_{CS} & v = 0, 1, \ldots, n_{group}^{RA}n_{shift}^{RA} + \bar{n}_{shift}^{RA} - 1 \\ \bar{d}_{start} + (v - n_{shift}^{RA}n_{group}^{RA} - \bar{n}_{shift}^{RA})N_{CS} & v = n_{shift}^{RA}n_{group}^{RA} + \bar{n}_{shift}^{RA}, \ldots, n_{shift}^{RA}n_{group}^{RA} + \bar{n}_{shift}^{RA} + \bar{\bar{n}}_{shift}^{RA} - 1 \\ \bar{\bar{d}}_{start} + (v - n_{shift}^{RA}n_{group}^{RA} - \bar{n}_{shift}^{RA} - \bar{\bar{n}}_{shift}^{RA})N_{CS} & v = n_{shift}^{RA}n_{group}^{RA} + \bar{n}_{shift}^{RA} + \bar{\bar{n}}_{shift}^{RA}, \ldots, n_{shift}^{RA}n_{group}^{RA} + \bar{n}_{shift}^{RA} + \bar{\bar{n}}_{group}^{RA} + \bar{\bar{\bar{n}}}_{shift}^{RA} - 1 \end{cases}$$

It is equivalent to that when $0 \le v \le (n_{shift}^{RA} n_{group}^{RA} + \bar{n}_{shift}^{RA} - 1)$, the cyclic shift value $C_v$ satisfies a formula (1):

$$C_v = d_{start}\lfloor v/n_{shift}^{RA} \rfloor + (v \bmod n_{shift}^{RA})N_{CS} \quad (1)$$

When $(n_{shift}^{RA} n_{group}^{RA} + \bar{n}_{shift}^{RA} - 1) < v \le (n_{shift}^{RA} n_{group}^{RA} + \bar{n}_{shift}^{RA} + \bar{\bar{n}}_{shift}^{RA} - 1)$, the cyclic shift value $C_v$ satisfies a formula (2):

$$C_v = \bar{d}_{start} + (v - n_{shift}^{RA} n_{group}^{RA} - \bar{n}_{shift}^{RA})N_{CS} \quad (2)$$

When $(n_{shift}^{RA} n_{group}^{RA} + \bar{n}_{shift}^{RA} + \bar{\bar{n}}_{shift}^{RA} - 1) < v \le (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the cyclic shift value $C_v$ satisfies a formula (3):

$$C_v = \bar{\bar{d}}_{start} + (v - n_{shift}^{RA} n_{group}^{RA} - \bar{n}_{shift}^{RA} - \bar{\bar{n}}_{shift}^{RA})N_{CS} \quad (3)$$

where $N_{CS}$ is an integer.

p is defined as a smallest nonnegative integer that satisfies $(p \times u) \bmod N_{ZC} = 1$.

$d_u$ satisfies $d_u = \begin{cases} p & 0 \le p < N_{ZC}/2 \\ N_{ZC} - p & \text{otherwise (otherwise)} \end{cases}$.

$x_{u,v}(n)$ has different implementations.

Implementation 1:

For $$\frac{N_{ZC} + N_{CS}}{4} \le d_u < \frac{2}{7}N_{ZC}, n_{shift}^{RA}, d_{start},$$

$n_{group}^{RA}, \bar{n}_{shift}^{RA}, \bar{\bar{n}}_{shift}^{RA}, \bar{\bar{\bar{n}}}_{shift}^{RA}, \bar{d}_{start}$, and $\bar{\bar{d}}_{start}$ satisfy formulas (4) to (11):

$$n_{shift}^{RA} = \left\lfloor \frac{4d_u - N_{ZC}}{N_{CS}} \right\rfloor \quad (4)$$

$$d_{start} = 4d_u - N_{ZC} + n_{shift}^{RA} \cdot N_{CS} \quad (5)$$

$$n_{group}^{RA} = \left\lfloor \frac{d_u}{d_{start}} \right\rfloor \quad (6)$$

$$\bar{n}_{shift}^{RA} = \max\left(\left\lfloor \frac{N_{ZC} - 3d_u - n_{group}^{RA} \cdot d_{start}}{N_{CS}} \right\rfloor, 0\right) \quad (7)$$

$$\bar{\bar{n}}_{shift}^{RA} = \lfloor \min(d_u - n_{group}^{RA} \cdot d_{start}, 4d_u - N_{ZC} - \bar{n}_{shift}^{RA}N_{CS})/N_{CS} \rfloor \quad (8)$$

$$\bar{d}_{start} = N_{ZC} - 3d_u + n_{group}^{RA} \cdot d_{start} + \bar{n}_{shift}^{RA}N_{CS} \quad (9)$$

$$\bar{\bar{\bar{n}}}_{shift}^{RA} = \lfloor ((1 - \min(1, \bar{n}_{shift}^{RA}))(d_u - n_{group}^{RA} \cdot d_{start}) + \min(1, \bar{n}_{shift}^{RA})(4d_u - N_{ZC} - \bar{n}_{shift}^{RA}N_{CS}))/N_{CS} \rfloor - \bar{\bar{n}}_{shift}^{RA} \quad (10)$$

$$\bar{\bar{d}}_{start} = N_{ZC} - 2d_u + n_{group}^{RA} \cdot d_{start} + \bar{\bar{n}}_{shift}^{RA}N_{CS} \quad (11)$$

Implementation 2:

For $$\frac{2}{7}N_{ZC} \le d_u \le \frac{N_{ZC} - N_{CS}}{3}, n_{shift}^{RA}, d_{start},$$

$n_{group}^{RA}, \bar{n}_{shift}^{RA}, \bar{\bar{n}}_{shift}^{RA}, \bar{\bar{\bar{n}}}_{shift}^{RA}, \bar{d}_{start}$, and $\bar{\bar{d}}_{start}$ satisfy formulas (12) to (19):

$$n_{shift}^{RA} = \left\lfloor \frac{N_{ZC} - 3d_u}{N_{CS}} \right\rfloor \quad (12)$$

$$d_{start} = N_{ZC} - 3d_u + n_{shift}^{RA} \cdot N_{CS} \quad (13)$$

-continued $$n_{group}^{RA} = \left\lfloor \frac{d_u}{d_{start}} \right\rfloor \quad (14)$$

$$\overline{n}_{shift}^{RA} = \max\left(\left\lfloor \frac{4d_u - N_{ZC} - n_{group}^{RA} \cdot d_{start}}{N_{CS}} \right\rfloor, 0\right) \quad (15)$$

$$\overline{\overline{n}}_{shift}^{RA} = \left\lfloor \min(d_u - n_{group}^{RA} \cdot d_{start}, N_{ZC} - 3d_u - \overline{n}_{shift}^{RA} N_{CS})/N_{CS} \right\rfloor \quad (16)$$

$$\overline{d}_{start} = d_u + n_{group}^{RA} \cdot d_{start} + \overline{n}_{shift}^{RA} N_{CS} \quad (17)$$

$$\overline{\overline{n}}_{shift}^{RA} = 0 \quad (18)$$

$$\overline{\overline{d}}_{start} = 0 \quad (19)$$

Implementation 3:
For $$\frac{N_{zc} + N_{cs}}{3} \le d_u < \frac{2N_{ZC}}{5}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy formulas (20) to (27):

$$n_{shift}^{RA} = \left\lfloor \frac{3d_u - N_{ZC}}{N_{CS}} \right\rfloor \quad (20)$$

$$d_{start} = 3d_u - N_{ZC} + n_{shift}^{RA} \cdot N_{CS} \quad (21)$$

$$n_{group}^{RA} = \left\lfloor \frac{d_u}{d_{start}} \right\rfloor \quad (22)$$

$$\overline{n}_{shift}^{RA} = \max\left(\left\lfloor \frac{N_{ZC} - 2d_u - n_{group}^{RA} \cdot d_{start}}{N_{CS}} \right\rfloor, 0\right) \quad (23)$$

$$\overline{\overline{n}}_{shift}^{RA} = 0 \quad (24)$$

$$\overline{\overline{d}}_{start} = 0 \quad (25)$$

$$\overline{\overline{\overline{n}}}_{shift}^{RA} = 0 \quad (26)$$

$$\overline{\overline{\overline{d}}}_{start} = 0 \quad (27)$$

Implementation 4:
For $$\frac{2N_{ZC}}{5} \le d_u \le \frac{N_{ZC} - N_{CS}}{2}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy formulas (28) to (35):

$$n_{shift}^{RA} = \left\lfloor \frac{N_{ZC} - 2d_u}{N_{CS}} \right\rfloor \quad (28)$$

$$d_{start} = 2(N_{ZC} - 2d_u) + n_{shift}^{RA} \cdot N_{CS} \quad (29)$$

$$n_{group}^{RA} = \left\lfloor \frac{N_{ZC} - d_u}{d_{start}} \right\rfloor \quad (30)$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right) \quad (31)$$

$$\overline{\overline{n}}_{shift}^{RA} = 0 \quad (32)$$

$$\overline{\overline{d}}_{start} = 0 \quad (33)$$

$$\overline{\overline{\overline{n}}}_{shift}^{RA} = 0 \quad (34)$$

$$\overline{\overline{\overline{d}}}_{start} = 0 \quad (35)$$

When the terminal device sends the random access preamble sequence according to the foregoing method, a success rate of random access can be improved.

For Implementation 1 to Implementation 4, the terminal device may implement any one of Implementation 1 to Implementation 4 only. Alternatively, the terminal device may implement any combination of Implementation 1 to Implementation 4. For example, the terminal device implements only Implementation 1. When the terminal device sends $x_{u,v}(n)$, $n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}_{shift}^{RA}$, $\overline{d}_{start}$, and $\overline{\overline{d}}_{start}$ that correspond to $x_{u,v}(n)$ satisfy the formulas (4) to (11). Alternatively, the terminal device implements Implementation 1 to Implementation 4.

Step 303: The base station detects a received random access preamble sequence signal.

In step 303, the base station detects the received random access preamble sequence signal sent by the terminal device. First, the base station receives the random access preamble sequence signal sent by the terminal device, and then detects the received random access preamble sequence signal based on $x_{u,v}(n)$ For expressions and explanations of $x_{u,v}(n)$, refer to step 302. Details are not described again.

The base station may detect the received random access preamble sequence signal in the following optional manners.

Optionally, the base station sequentially selects and traverses shift sequence numbers v within a range from 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$, to obtain corresponding $x_{u,v}(n)=x_u((n+C_v)\bmod N_{ZC})$. The base station detects the received random access preamble sequence signal based on each obtained $x_{u,v}(n)$ Optionally, the base station performs, based on the obtained $x_{u,v}(n)$, related detection on the random access preamble sequence sent by the terminal device. The related detection may be performed in time domain, or the detection may be performed in frequency domain based on a frequency domain detection manner corresponding to a time domain related detection manner.

For Implementation 1 to Implementation 4 in step 302, the base station device may implement any one of Implementation 1 to Implementation 4 only. Alternatively, the base station device may implement any combination of Implementation 1 to Implementation 4. For example, the base station implements only Implementation 1. $n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}_{shift}^{RA}$, $\overline{d}_{start}$, and $\overline{\overline{d}}_{start}$ that correspond to $x_{u,v}(n)$ satisfy the formulas (4) to (11). Alternatively, the base station implements Implementation 1 to Implementation 4.

The base station detects the received random access preamble sequence signal. Therefore, when different terminal devices simultaneously send random access preamble sequences and the random access preamble sequences of the different terminal devices correspond to different $C_v$, mutual interference between the terminal devices can be avoided, thereby improving a success rate of random access.

The method in the embodiments of the present invention is described in detail above with reference to FIG. 3. A terminal device and a base station in the embodiments of the present invention are described in detail below with reference to FIG. 4 and FIG. 5.

Figure 4:
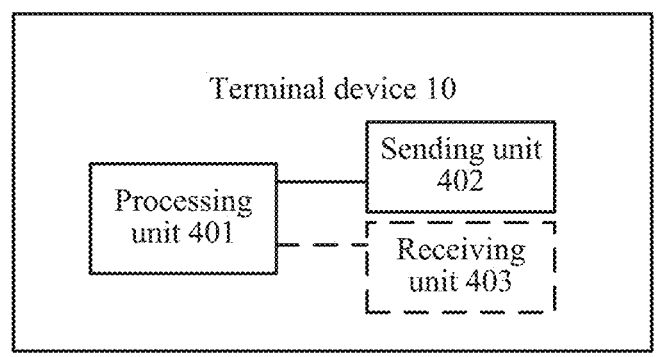
FIG. 4 is a schematic block diagram of a terminal device according to an embodiment of the present invention.

As shown in FIG. 4, an embodiment of the present invention provides the terminal device 10 shown in FIG. 1. The terminal device 10 may be a terminal device 10A or a terminal device 10B and includes: a processing unit 401, configured to determine a random access preamble sequence $x_{u,v}(n)$, where $x_{u,v}(n)$ satisfies $x_{u,v}(n)=x_u((n+C_v) \bmod N_{ZC})$, a ZC (Zadoff-Chu) sequence whose root sequence number is u is defined as:

$$x_u(n) = e^{-j\frac{\pi u n(n+1)}{N_{ZC}}}, 0 \le n \le N_{ZC} - 1, N_{ZC}$$

is a sequence length of $x_u(n)$, mod represents a modulo operation, and $C_v$ satisfies:

$$C_v = \begin{cases} d_{start}\lfloor v/n_{shift}^{RA}\rfloor + (v \bmod n_{shift}^{RA})N_{CS} & v = 0, 1, \ldots, n_{group}^{RA}n_{shift}^{RA} + \overline{n}_{shift}^{RA} - 1 \\ \overline{d}_{start} + (v - n_{shift}^{RA}n_{group}^{RA} - \overline{n}_{shift}^{RA})N_{CS} & v = n_{shift}^{RA}n_{group}^{RA} + \overline{n}_{shift}^{RA}, \ldots, n_{shift}^{RA}n_{group}^{RA} + \overline{n}_{shift}^{RA} + \overline{\overline{n}}_{shift}^{RA} - 1 \\ \overline{\overline{d}}_{start} + (v - n_{shift}^{RA}n_{group}^{RA} - \overline{n}_{shift}^{RA} - \overline{\overline{n}}_{shift}^{RA})N_{CS} & v = n_{shift}^{RA}n_{group}^{RA} + \overline{n}_{shift}^{RA} + \overline{\overline{n}}_{shift}^{RA}, \ldots, n_{shift}^{RA}n_{group}^{RA} + \overline{n}_{shift}^{RA} + \overline{n}_{group}^{=RA} + \overline{\overline{n}}_{shift}^{RA} - 1, \end{cases}$$

where $N_{CS}$ is an integer; and
for $$\frac{N_{ZC} + N_{CS}}{4} \le d_u < \frac{2}{7}N_{ZC}, n_{shift}^{RA}, d_{start},$$

$$n_{group}^{RA}, \overline{n}_{shift}^{RA}, \overline{\overline{n}}_{shift}^{RA}, \overline{n}_{shift}^{=RA}, \overline{d}_{start}, \text{ and } \overline{\overline{d}}_{start}$$

satisfy:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\overline{n}_{shift}^{=RA} = \lfloor \min(d_u - n_{group}^{RA} \cdot d_{start}, 4d_u - N_{ZC} - \overline{n}_{shift}^{RA}N_{CS})/N_{CS}\rfloor$$

$$\overline{d}_{start} = N_{ZC} - 3d_u + n_{group}^{RA} \cdot d_{start} + \overline{n}_{shift}^{RA}N_{CS}$$

$$\overline{\overline{d}}_{start} = N_{ZC} - 3d_u + n_{group}^{RA} \cdot d_{start} + \overline{n}_{shift}^{RA}N_{CS}$$

$$\overline{\overline{n}}_{shift}^{=RA} = \lfloor((1 - \min(1, \overline{n}_{shift}^{RA}))(d_u - n_{group}^{RA} \cdot d_{start}) + \min(1, \overline{n}_{shift}^{RA})(4d_u - N_{ZC} - \overline{n}_{shift}^{RA}N_{CS}))/N_{CS}\rfloor - \overline{n}_{shift}^{=RA}$$

$$\overline{\overline{d}}_{start} = N_{ZC} - 2d_u + n_{group}^{RA} \cdot d_{start} + \overline{n}_{shift}^{=RA}N_{CS}$$

for $$\frac{2}{7}N_{ZC} \le d_u \le \frac{N_{ZC} - N_{CS}}{3}, n_{shift}^{RA}, d_{start},$$

$$n_{group}^{RA}, \overline{n}_{shift}^{RA}, \overline{n}_{shift}^{=RA}, \overline{\overline{n}}_{shift}^{=RA}, \overline{d}_{start}, \text{ and } \overline{\overline{d}}_{start}$$

satisfy:

$$n_{shift}^{RA} = \left\lfloor \frac{N_{ZC} - 3d_u}{N_{CS}} \right\rfloor$$

$$d_{start} = N_{ZC} - 3d_u + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\overline{n}_{shift}^{=RA}, = \lfloor \min(d_u - n_{group}^{RA} \cdot d_{start}, N_{ZC} - 3d_u - \overline{n}_{shift}^{RA}, N_{CS})/N_{CS}\rfloor$$

$$\overline{\overline{d}}_{start} = d_u + n_{group}^{RA} \cdot d_{start} + \overline{n}_{shift}^{RA}, N_{CS}$$

-continued $$\overline{\overline{n}}_{shift}^{=RA} = 0, \overline{\overline{d}}_{start} = 0;$$

for $$\frac{N_{ZC} + N_{CS}}{3} \le d_u < \frac{2N_{ZC}}{5} n_{shift}^{RA}, d_{start}, n_{group}^{RA}, \overline{n}_{shift}^{RA}, \overline{\overline{n}}_{shift}^{RA}, \overline{n}_{shift}^{=RA},$$

$$\overline{d}_{start} \text{ and } \overline{\overline{d}}_{start}$$

satisfy:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 2d_u - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{n}_{shift}^{=RA}, = 0, \overline{\overline{d}}_{start} = 0;$$

or for $$\frac{2N_{ZC}}{5} \le d_u \le \frac{N_{ZC} - N_{CS}}{2} n_{shift}^{RA}, d_{start}, n_{group}^{RA}, \overline{n}_{shift}^{RA}, \overline{n}_{shift}^{=RA}, \overline{\overline{n}}_{shift}^{=RA},$$

$$\overline{d}_{start} \text{ and } \overline{\overline{d}}_{start}$$

satisfy:

$$n_{shift}^{RA} = \left\lfloor \frac{N_{ZC} - 2d_u}{N_{CS}} \right\rfloor$$

$$d_{start} = 2(N_{ZC} - 2d_u) + n_{shift}^{RA} \cdot N_{CS}$$

$$n_{group}^{RA} = \left\lfloor \frac{N_{ZC} - d_u}{d_{start}} \right\rfloor$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\overline{\overline{n}}_{shift}^{RA} = 0, \overline{\overline{d}}_{start} = 0, \overline{\overline{\overline{n}}}_{shift}^{RA} = 0, \overline{\overline{\overline{d}}}_{start} = 0,$$

where $d_u$ satisfies:

$$d_u = \begin{cases} p & 0 \le p < N_{ZC}/2 \\ N_{ZC} - p & \text{otherwise (otherwise)} \end{cases},$$

and
p is defined as a smallest nonnegative integer that satisfies
(p×u)mod $N_{ZC}$=1; and
a sending unit 402, configured to send $x_{u,v}(n)$.
For $$C_v = \begin{cases} d_{start}\lfloor v/n_{shift}^{RA} \rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{\overline{d}}_{start} + (v - n_{shift}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{\overline{d}}}_{start} + (v - n_{shift}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1, \end{cases},$$

during implementation of the present invention, when $\overline{n}_{shift}^{RA}=0$ and $\overline{\overline{n}}_{shift}^{RA} \ne 0$, $$C_v = \begin{cases} d_{start}\lfloor v/n_{shift}^{RA} \rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{\overline{\overline{d}}}_{start} + (v - n_{shift}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1, \end{cases}.$$

When $\overline{n}_{shift}^{RA} \ne 0$ and $\overline{\overline{n}}_{shift}^{RA} = 0$, $$C_v = \begin{cases} d_{start}\lfloor v/n_{shift}^{RA} \rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{\overline{d}}_{start} + (v - n_{shift}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \end{cases}.$$

When $\overline{n}_{shift}^{RA}=0$ and $\overline{\overline{n}}_{shift}^{RA}=0$, $$C_v = \left\{ d_{start}\lfloor v/n_{shift}^{RA} \rfloor + (v \bmod n_{shift}^{RA})N_{CS} \quad v = 0, 1, \ldots, n_{group}^{RA} n_{shift}^{RA} + \overline{n}_{shift}^{RA} - 1 \right..$$

When the terminal device performs random access, a success rate of random access in a high-speed movement environment can be improved.

For four implementations of $$\frac{N_{ZC}+N_{CS}}{4} \leq d_u < \frac{2}{7}N_{ZC}$$

(corresponding to Implementation 1 in step 302), $$\frac{2}{7}N_{ZC} \leq d_u \leq \frac{N_{ZC}-N_{CS}}{3}$$

(corresponding to Implementation 2 in step 302), $$\frac{N_{ZC}+N_{CS}}{3} \leq d_u < \frac{2N_{ZC}}{5}$$

(corresponding to Implementation 3 in step 302), and $$\frac{2N_{ZC}}{5} \leq d_u \leq \frac{N_{ZC}-N_{CS}}{2}$$

(corresponding to Implementation 4 in step 302), the processing unit 401 may be configured to implement any one of Implementation 1 to Implementation 4 only. Alternatively, the processing unit 401 may perform processing based on any combination of Implementation 1 to Implementation 4. For example, the processing unit 401 implements only Implementation 1. When the processing unit 401 determines $x_{u,v}(n)$, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}_{shift}^{RA}$, $\bar{d}_{start}$, and $\bar{\bar{d}}_{start}$ that correspond to $x_{u,v}(n)$ satisfy the formulas (4) to (11). Alternatively, the processing unit 401 implements Implementation 1 to Implementation 4.

Figure 5:
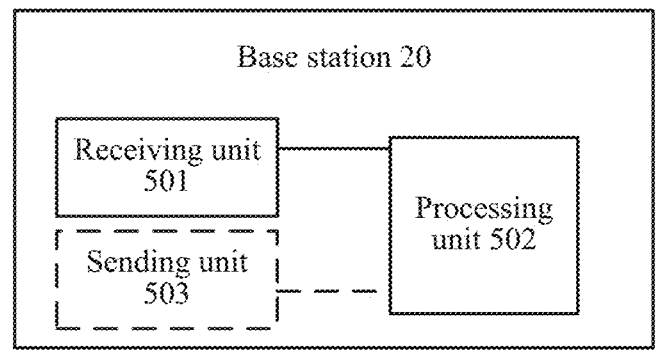
FIG. 5 is a schematic block diagram of a base station according to an embodiment of the present invention.

As shown in FIG. 5, an embodiment of the present invention provides the base station 20 shown in FIG. 1. The base station 20 includes: a receiving unit 501, configured to receive a random access preamble sequence signal; and a processing unit 502, configured to process the received random access preamble sequence signal based on a random access preamble sequence $x_{u,v}(n)$, where $x_{u,v}(n)$ satisfies (±, a ZC (Zadoff-Chu) sequence whose root sequence number is u is defined as:

$$x_u(n) = e^{-j\frac{\pi u n(n+1)}{N_{ZC}}}, 0 \leq n \leq N_{ZC}-1, N_{ZC}$$

is a sequence length of $x_u(n)$ mod represents a modulo operation, and $C_v$ satisfies:

where $N_{CS}$ is an integer; and for $$\frac{N_{ZC}+N_{CS}}{4} \leq d_u < \frac{2}{7}N_{ZC}, n_{shift}^{RA}, d_{start},$$

$n_{group}^{RA}$, $\bar{n}_{shift}^{RA}$, $\bar{\bar{n}}_{shift}^{RA}$, $\bar{\bar{\bar{n}}}_{shift}^{RA}$, $\bar{d}_{start}$, and $\bar{\bar{d}}_{start}$ satisfy:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\bar{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\bar{\bar{n}}_{shift}^{RA} = \lfloor \min(d_u - n_{group}^{RA} \cdot d_{start}, 4d_u - N_{ZC} - n_{shift}^{RA} N_{CS})/N_{CS} \rfloor$$

$$\bar{d}_{start} = N_{ZC} - 3d_u + n_{group}^{RA} \cdot d_{start} + \bar{n}_{shift}^{RA} N_{CS}$$

$$\bar{\bar{\bar{n}}}_{shift}^{RA} = \lfloor ((1 - \min(1, \bar{n}_{shift}^{RA}))(d_u - n_{group}^{RA} \cdot d_{start}) + \min(1, \bar{n}_{shift}^{RA})(4d_u - N_{ZC} - \bar{n}_{shift}^{RA} N_{CS}))/N_{CS} \rfloor - \bar{n}_{shift}^{RA}$$

$$\bar{\bar{d}}_{start} = N_{ZC} - 2d_u + n_{group}^{RA} \cdot d_{start} + \bar{n}_{shift}^{RA} N_{CS}$$

for $$\frac{2}{7}N_{ZC} \leq d_u \leq \frac{N_{ZC}-N_{CS}}{3}, n_{shift}^{RA}, d_{start},$$

$n_{group}^{RA}$, $\bar{n}_{shift}^{RA}$, $\bar{\bar{n}}_{shift}^{RA}$, $\bar{\bar{\bar{n}}}_{shift}^{RA}$, $\bar{d}_{start}$, and $\bar{\bar{d}}_{start}$ satisfy:

$$n_{shift}^{RA} = \left\lfloor \frac{N_{ZC} - 3d_u}{N_{CS}} \right\rfloor$$

$$d_{start} = N_{ZC} - 3d_u + n_{shift}^{RA} \cdot N_{CS}$$

$$n_{group}^{RA} = \left\lfloor \frac{d_u}{d_{start}} \right\rfloor$$

$$\bar{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\bar{\bar{n}}_{shift}^{RA} = \lfloor \min(d_u - n_{group}^{RA} \cdot d_{start}, N_{ZC} - 3d_u - \bar{n}_{shift}^{RA} N_{CS})/N_{CS} \rfloor$$

$$\bar{d}_{start} = d_u + n_{group}^{RA} \cdot d_{start} + \bar{n}_{shift}^{RA} N_{CS}$$

$$\bar{\bar{\bar{n}}}_{shift}^{RA} = 0, \bar{\bar{d}}_{start} = 0;$$

$$C_v = \begin{cases} d_{start}\lfloor v/n_{shift}^{RA} \rfloor + (v \bmod n_{shift}^{RA})N_{CS} & v = 0, 1, \ldots, n_{group}^{RA} n_{shift}^{RA} + \bar{n}_{shift}^{RA} - 1 \\ \bar{d}_{start} + (v - n_{shift}^{RA} n_{group}^{RA} - \bar{n}_{shift}^{RA})N_{CS} & v = n_{shift}^{RA} n_{group}^{RA} + \bar{n}_{shift}^{RA}, \ldots, n_{shift}^{RA} n_{group}^{RA} + \bar{n}_{shift}^{RA} + \bar{\bar{n}}_{shift}^{RA} - 1 \\ \bar{\bar{d}}_{start} + (v - n_{shift}^{RA} n_{group}^{RA} - \bar{n}_{shift}^{RA} - \bar{\bar{n}}_{shift}^{RA})N_{CS} & v = n_{shift}^{RA} n_{group}^{RA} + \bar{n}_{shift}^{RA} + \bar{\bar{n}}_{shift}^{RA}, \ldots, n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1, \end{cases}$$

for $$\frac{N_{ZC}+N_{CS}}{3} \le d_u < \frac{2N_{ZC}}{5}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor \text{ or}$$

$$\overline{n}_{shift}^{RA} = \max\left(\left\lfloor \frac{N_{ZC} - 2d_u - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0;$$

for $$\frac{2N_{ZC}}{5} \le d_u \le \frac{N_{ZC}-N_{CS}}{2}, n_{shift}^{RA}, d_{start},$$

$$n_{shift}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{N_{ZC} - 2d_u}{N_{CS}} \right\rfloor$$

$$d_{start} = 2(N_{ZC} - 2d_u) + n_{shift}^{RA} \cdot N_{CS}$$

$$n_{group}^{RA} = \left\lfloor \frac{N_{ZC} - d_u}{d_{start}} \right\rfloor$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0,$$

where $d_u$ satisfies:

$$d_u = \begin{cases} p & 0 \le p < N_{ZC}/2 \\ N_{ZC}-p & \text{otherwise (otherwise)} \end{cases},$$

and p is defined as a smallest nonnegative integer that satisfies (p×u)mod $N_{ZC}$=1.

Figure 2B:
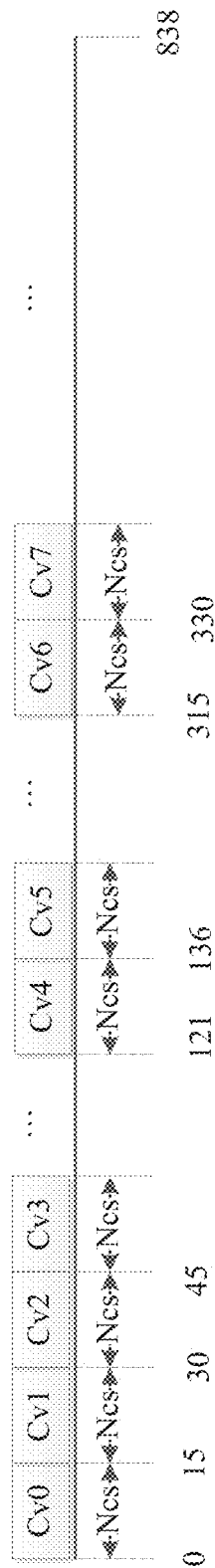
FIG. 2b is a schematic diagram of a terminal device cyclic shift obtained according to an embodiment of the present invention when u=220 and Ncs=15.

When the base station receives the random access preamble sequence, mutual interference between terminal devices can be avoided in a high-speed movement environment, thereby improving a success rate of random access. For example, parameters of the random access preamble sequence are u=220 and $N_{CS}$=15. As shown in FIG. 2b, a cyclic shift value satisfying the condition 1 is $C_v$=0, 15, 30, 45, 121, 136, 315, 330, this case, $d_u$=225 When the base station detects a random access preamble sequence whose cyclic shift value is 0, a peak value may occur at positions of 15 shift values starting from a cyclic shift value 389, 614, 0, 225, or 450. When the base station detects a random access preamble sequence whose cyclic shift value is 330, a peak value may occur at positions of 15 shift values starting from a cyclic shift value 719, 105, 330, 555, or 780. The peak values that the two sequences may have do not overlap, thereby avoiding vagueness during base station detection and mutual interference between terminal devices.

For four implementations of $$\frac{N_{ZC}+N_{CS}}{4} \le d_u < \frac{2}{7}N_{ZC}$$

(corresponding to Implementation 1 in step 302), $$\frac{2}{7}N_{ZC} \le d_u \le \frac{N_{ZC}-N_{CS}}{3}$$

(corresponding to Implementation 2 in step 302), $$\frac{N_{ZC}+N_{CS}}{3} \le d_u < \frac{2N_{ZC}}{5}$$

(corresponding to Implementation 3 in step 302), and $$\frac{2N_{ZC}}{5} \le d_u \le \frac{N_{ZC}-N_{CS}}{2}$$

(corresponding to Implementation 4 in step 302), the processing unit 502 may be configured to implement any one of Implementation 1 to Implementation 4 only. Alternatively, the processing unit 502 may perform processing based on any combination of Implementation 1 to Implementation 4. For example, the processing unit 502 implements only Implementation 1. When the processing unit 502 determines $$x_{u,v}(n), n_{shift}^{RA}, d_{start}, n_{group}^{RA}, \overline{n}_{shift}^{RA}, \overline{\overline{n}}_{shift}^{RA}, \overline{\overline{\overline{n}}}_{shift}^{RA}, \overline{d}_{start},$$

and $\overline{\overline{d}}_{start}$ that correspond to $x_{u,v}(n)$ satisfy the formulas (4) to (11). Alternatively, the processing unit 502 implements Implementation 1 to Implementation 4.

Figure 6:
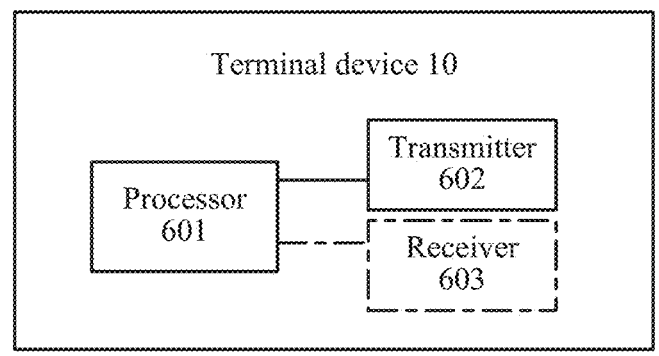
FIG. 6 is a schematic block diagram of a terminal device according to another embodiment of the present invention.
Figure 7:
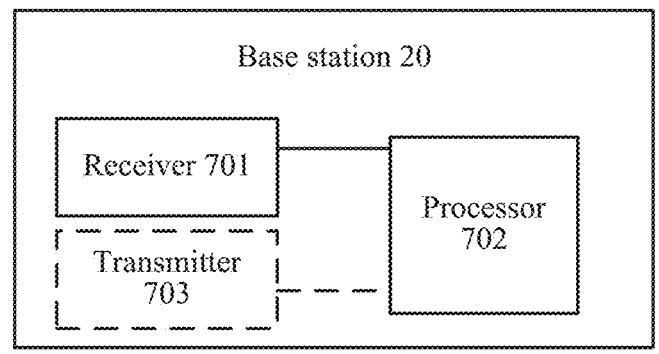
FIG. 7 is a schematic block diagram of a base station according to another embodiment of the present invention.

The terminal device 10 including a processor 601, a transmitter 602, and a receiver 603 is shown in FIG. 6. The base station 20 including a processor 702, a transmitter 703, and a receiver 701 is shown in FIG. 7.

The processing unit 401 may be specifically the processor 601. The sending unit 402 may be specifically the transmitter 602. The receiving unit 403 may be specifically the receiver 603. The processing unit 502 may be specifically the processor 702. The sending unit 503 may be specifically the transmitter 703. The receiving unit 501 may be specifically the receiver 701.

It should be understood that in this embodiment of the present invention, the processors 601 and 702 may be a central processing unit (CPU), or the processors 601 and 702 may be another general-purpose processor, a digital signal processor (DSP), an application-specific integrated circuit (ASIC), a field programmable gate array (FPGA), or another programmable logic device, a discrete gate or transistor logic device, a discrete hardware component, or the like. The general-purpose processor may be a microprocessor, or the processor may be any conventional processor or the like.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A method, performed by a device for communication system or a processor for the device, comprising:
   sending indication information to a terminal device, the indication information indicating an $N_{CS}$ value, and
   receiving, from the terminal device, a random access preamble sequence $x_{u,v}(n)$, wherein $x_{u,v}(n)$ is based on a sequence with a root sequence number u and a sequence length $N_{ZC}$, the sequence is represented by $x_u(n)$, and wherein $x_{u,v}(n)=x_u((n+C_v) \bmod N_{ZC})$, mod represents a modulo operation, and $C_v$ is a cyclic shift that satisfies:

$$C_v = \begin{cases} d_{start}\lfloor v/n_{shift}^{RA}\rfloor + (v \bmod n_{shift}^{RA})N_{CS} & v = 0, 1, \ldots, n_{group}^{RA} n_{shift}^{RA} + \overline{n}_{shift}^{RA} - 1 \\ \overline{d}_{start} + (v - n_{shift}^{RA} n_{group}^{RA} - \overline{n}_{shift}^{RA})N_{CS} & v = n_{shift}^{RA} n_{group}^{RA} + \overline{n}_{shift}^{RA}, \ldots, n_{shift}^{RA} n_{group}^{RA} + \overline{n}_{shift}^{RA} + \overline{\overline{n}}_{shift}^{RA} - 1 \\ \overline{\overline{d}}_{start} + (v - n_{shift}^{RA} n_{group}^{RA} - \overline{n}_{shift}^{RA} - \overline{\overline{n}}_{shift}^{RA})N_{CS} & v = n_{shift}^{RA} n_{group}^{RA} + \overline{n}_{shift}^{RA} + \overline{\overline{n}}_{shift}^{RA}, \ldots, n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1, \end{cases}$$

wherein $N_{CS}$ has a value indicated by the indication information; and for $$\frac{N_{ZC} + N_{CS}}{4} \leq d_u < \frac{2}{7}N_{ZC}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, 4d_u - N_{ZC} - n_{shift}^{RA} N_{CS})/N_{CS} \rfloor$$

$$\overline{d}_{start} = N_{ZC} - 3d_u + \overline{n}_{group}^{RA} \cdot d_{start} + n_{shift}^{RA} N_{CS}$$

$$\overline{\overline{\overline{n}}}_{shift}^{RA} = \lfloor((1 - \min(1, \overline{n}_{shift}^{RA}))(d_u - n_{group}^{RA} \cdot d_{start}) +$$
$$\min(1, \overline{n}_{shift}^{RA})(4d_u - N_{ZC} - n_{shift}^{RA} N_{CS}))/N_{CS}\rfloor - \overline{n}_{shift}^{RA}$$

$$\overline{\overline{d}}_{start} = N_{ZC} - 2d_u + n_{group}^{RA} \cdot d_{start} + \overline{n}_{shift}^{RA} N_{CS};$$

wherein $d_u$ satisfies:

$$d_u = \begin{cases} p & 0 \leq p < N_{ZC}/2 \\ N_{ZC} - p & \text{otherwise} \end{cases},$$

and p is defined as a smallest nonnegative integer that satisfies $(p \times u) \bmod N_{ZC}=1$.

2. The method according to claim 1, wherein for $$\frac{2}{7}N_{ZC} \leq d_u \leq \frac{N_{ZC} - N_{CS}}{3}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{N_{ZC} - 3d_u}{N_{CS}} \right\rfloor$$

$$d_{start} = N_{ZC} - 3d_u + n_{shift}^{RA} \cdot N_{CS}$$

-continued $$n_{group}^{RA} = \left\lfloor \frac{d_u}{d_{start}} \right\rfloor$$

$$\overline{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\overline{\overline{n}}_{shift}^{RA} = \lfloor \min(d_u - n_{group}^{RA} \cdot d_{start}, N_{ZC} - 3d_u - \overline{n}_{shift}^{RA} N_{CS})/N_{CS} \rfloor$$

$$\overline{d}_{start} = d_u + n_{group}^{RA} \cdot d_{start} + \overline{n}_{shift}^{RA} N_{CS}$$

$$\overline{\overline{\overline{n}}}_{shift}^{RA} = 0, \overline{\overline{d}}_{start} = 0.$$

3. The method according to claim 1, wherein for $$\frac{N_{ZC} + N_{CS}}{3} \leq d_u < \frac{2N_{ZC}}{5}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC} - 2d_u - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0.$$

4. The method according to claim 1, wherein for $$\frac{2N_{ZC}}{5} \le d_u \le \frac{N_{ZC}-N_{CS}}{2}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{N_{ZC}-2d_u}{N_{CS}} \right\rfloor$$

$$d_{start} = 2(N_{ZC}-2d_u) + n_{shift}^{RA} \cdot N_{CS}$$

$$n_{group}^{RA} = \left\lfloor \frac{N_{ZC}-d_u}{d_{start}} \right\rfloor$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0.$$

5. The method according to claim 1, wherein
for $N_{CS} \le d_u < N_{ZC}/5$, $n_{shift}^{RA}$, $d_{start}$, $n_{group}^{RA}$, and $\overline{n}_{shift}^{RA}$ satisfy:

$$n_{shift}^{RA} = \lfloor d_u/N_{CS} \rfloor$$

$$d_{start} = 4d_u + n_{shift}^{RA} N_{CS}$$

$$n_{group}^{RA} = \lfloor N_{ZC}/d_{start} \rfloor$$

$$\overline{n}_{shift}^{RA} = \max(\lfloor (N_{ZC}-4d_u-n_{group}^{RA} d_{start})/N_{CS} \rfloor, 0); \text{ and}$$

for $N_{ZC}/5 \le d_u \le (N_{ZC}-N_{CS})/4$, $n_{shift}^{RA}$, $d_{start}$, $n_{group}^{RA}$, and $\overline{n}_{shift}^{RA}$ satisfy:

$$n_{shift}^{RA} = \lfloor (N_{ZC}-4d_u)/N_{CS} \rfloor$$

$$d_{start} = N_{ZC}-4d_u + n_{shift}^{RA} N_{CS}$$

$$n_{group}^{RA} = \lfloor d_u/d_{start} \rfloor$$

$$\overline{n}_{shift}^{RA} = \min(\max(\lfloor (d_u - n_{group}^{RA} d_{start})/N_{CS} \rfloor, 0), n_{shift}^{RA}).$$

6. The method according to claim 5, wherein for $$\frac{2}{7}N_{ZC} \le d_u \le \frac{N_{ZC}-N_{CS}}{3}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{N_{ZC}-3d_u}{N_{CS}} \right\rfloor$$

$$d_{start} = N_{ZC}-3d_u + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\overline{\overline{n}}_{shift}^{RA} = \left\lfloor \min(d_u - n_{group}^{RA} \cdot d_{start}, N_{ZC}-3d_u - \overline{n}_{shift}^{RA} N_{CS})/N_{CS} \right\rfloor$$

$$\overline{d}_{start} = d_u + n_{group}^{RA} \cdot d_{start} + \overline{n}_{shift}^{RA} N_{CS}$$

$$\overline{\overline{\overline{n}}}_{shift}^{RA} = 0, \overline{\overline{d}}_{start} = 0;$$

for $$\frac{N_{ZC}+N_{CS}}{3} \le d_u < \frac{2N_{ZC}}{5}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor$$

$$\overline{n}_{shift}^{RA} = \max\left(\left\lfloor \frac{N_{ZC}-2d_u - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0; \text{ and}$$

for $$\frac{2N_{ZC}}{5} \le d_u \le \frac{N_{ZC}-N_{CS}}{2}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{N_{ZC}-2d_u}{N_{CS}} \right\rfloor$$

$$d_{start} = 2(N_{ZC}-2d_u) + n_{shift}^{RA} \cdot N_{CS}$$

$$n_{group}^{RA} = \left\lfloor \frac{N_{ZC}-d_u}{d_{start}} \right\rfloor$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\overline{\overline{n}}_{shift}^{RA} = 0, \overline{d}_{start} = 0, \overline{\overline{\overline{n}}}_{shift}^{RA} = 0, \overline{\overline{d}}_{start} = 0.$$

7. The method according to claim 1, wherein for $$\frac{2}{7}N_{ZC} \le d_u \le \frac{N_{ZC}-N_{CS}}{3}, n_{shift}^{RA}, d_{start},$$

$$n_{group}^{RA}, \overline{n}_{shift}^{RA}, \overline{\overline{n}}_{shift}^{RA}, \overline{\overline{\overline{n}}}_{shift}^{RA}, \overline{d}_{start}, \text{ and } \overline{\overline{d}}_{start}$$

satisfy:

$$n_{shift}^{RA} = \left\lfloor \frac{N_{ZC} - 3d_u}{N_{CS}} \right\rfloor$$
$$d_{start} = N_{ZC} - 3d_u + n_{shift}^{RA} \cdot N_{CS}$$
$$n_{group}^{RA} = \left\lfloor \frac{d_u}{d_{start}} \right\rfloor$$
$$\bar{n}_{shift}^{RA} = \max\left(\left\lfloor \frac{4d_u - N_{ZC} - n_{group}^{RA} \cdot d_{start}}{N_{CS}} \right\rfloor, 0\right)$$
$$\bar{\bar{n}}_{shift}^{RA} = \left\lfloor \min(d_u - n_{group}^{RA} \cdot d_{start}, N_{ZC} - 3d_u - \bar{n}_{shift}^{RA} N_{CS})/N_{CS} \right\rfloor$$
$$\bar{\bar{d}}_{start} = d_u + n_{group}^{RA} \cdot d_{start} + \bar{n}_{shift}^{RA} N_{CS}$$
$$\bar{\bar{\bar{n}}}_{shift}^{RA} = 0, \bar{\bar{\bar{d}}}_{start} = 0$$

for $$\frac{N_{ZC} + N_{CS}}{3} \le d_u < \frac{2N_{ZC}}{5}, n_{shift}^{RA}, d_{start},$$
$$n_{group}^{RA}, \bar{n}_{shift}^{RA}, \bar{\bar{n}}_{shift}^{RA}, \bar{\bar{\bar{n}}}_{shift}^{RA}, \bar{\bar{d}}_{start}, \text{ and } \bar{\bar{\bar{d}}}_{start}$$

satisfy:

$$n_{shift}^{RA} = \left\lfloor \frac{3d_u - N_{ZC}}{N_{CS}} \right\rfloor$$
$$d_{start} = 3d_u - N_{ZC} + n_{shift}^{RA} \cdot N_{CS}$$
$$n_{group}^{RA} = \left\lfloor \frac{d_u}{d_{start}} \right\rfloor \text{ and}$$
$$\bar{n}_{shift}^{RA} = \max\left(\left\lfloor \frac{N_{ZC} - 2d_u - n_{group}^{RA} \cdot d_{start}}{N_{CS}} \right\rfloor, 0\right)$$
$$\bar{\bar{n}}_{shift}^{RA} = 0, \bar{\bar{d}}_{start} = 0, \bar{\bar{\bar{n}}}_{shift}^{RA} = 0, \bar{\bar{\bar{d}}}_{start} = 0;$$

for $$\frac{2N_{ZC}}{5} \le d_u \le \frac{N_{ZC} - N_{CS}}{2}, n_{shift}^{RA}, d_{start},$$
$$n_{group}^{RA}, \bar{n}_{shift}^{RA}, \bar{\bar{n}}_{shift}^{RA}, \bar{\bar{\bar{n}}}_{shift}^{RA}, \bar{\bar{d}}_{start}, \text{ and } \bar{\bar{\bar{d}}}_{start}$$

satisfy:

$$n_{shift}^{RA} = \left\lfloor \frac{N_{ZC} - 2d_u}{N_{CS}} \right\rfloor$$
$$d_{start} = 2(N_{ZC} - 2d_u) + n_{shift}^{RA} \cdot N_{CS}$$

-continued $$n_{group}^{RA} = \left\lfloor \frac{N_{ZC} - d_u}{d_{start}} \right\rfloor$$
$$\bar{n}_{shift}^{RA} = \max\left(\left\lfloor \frac{3d_u - N_{ZC} - n_{group}^{RA} \cdot d_{start}}{N_{CS}} \right\rfloor, 0\right)$$
$$\bar{\bar{n}}_{shift}^{RA} = 0, \bar{\bar{d}}_{start} = 0, \bar{\bar{\bar{n}}}_{shift}^{RA} = 0, \bar{\bar{\bar{d}}}_{start} = 0.$$

8. The method according to claim 1, wherein the indication information includes an Ncs index.

9. The method according to claim 8, wherein a mapping relationship between the Ncs index and a value of Ncs is as follows:

| Ncs index | Ncs |
| --- | --- |
| 0 | 15 |
| 1 | 18 |
| 2 | 22 |
| 3 | 26 |
| 4 | 32 |
| 5 | 38 |
| 6 | 46 |
| 7 | 55 |
| 8 | 68 |
| 9 | 82 |
| 10 | 100 |
| 11 | 118 |
| 12 | 137. |

10. The method according to claim 1, wherein the sequence with the root sequence number u and the sequence length $N_{ZC}$ satisfies:

$$x_u(n) = e^{-j\frac{\pi u n(n+1)}{N_{ZC}}}, 0 \le n \le N_{ZC} - 1.$$

11. The method according to claim 1, further comprising: indicating a logic root sequence number, wherein the logic root sequence number is associated with the root sequence number u.

12. A device for communications system, comprising:
one or more processors, configured to execute program instructions stored in a memory, wherein the program instructions, when executed by the one or more processors, cause the device to:
send indication information to a terminal device, the indication information indicating an $N_{CS}$ value, and
receive, from the terminal device, a random access preamble sequence $x_{u,v}(n)$, wherein $x_{u,v}(n)$ is based on a sequence with a root sequence number u and a sequence length $N_{ZC}$, the sequence is represented by $x_u(n)$, and wherein $x_{u,v}(n) = x_u((n+C_v) \bmod N_{ZC})$, mod represents a modulo operation, and $C_v$ is a cyclic shift that satisfies:

$$C_v = \begin{cases} d_{start}\lfloor v/n_{shift}^{RA} \rfloor + (v \bmod n_{shift}^{RA})N_{CS} & v = 0, 1, \ldots, n_{group}^{RA} n_{shift}^{RA} + \bar{n}_{shift}^{RA} - 1 \\ \bar{\bar{d}}_{start} + (v - n_{shift}^{RA} n_{group}^{RA} - \bar{n}_{shift}^{RA})N_{CS} & v = n_{shift}^{RA} n_{group}^{RA} + \bar{n}_{shift}^{RA}, \ldots, n_{shift}^{RA} n_{group}^{RA} + \bar{n}_{shift}^{RA} + \bar{\bar{n}}_{shift}^{RA} - 1 \\ \bar{\bar{\bar{d}}}_{start} + (v - n_{shift}^{RA} n_{group}^{RA} - \bar{n}_{shift}^{RA} - \bar{\bar{n}}_{shift}^{RA})N_{CS} & v = n_{shift}^{RA} n_{group}^{RA} + \bar{n}_{shift}^{RA} + \bar{\bar{n}}_{shift}^{RA}, \ldots, n_{shift}^{RA} n_{group}^{RA} + \bar{n}_{shift}^{RA} + \bar{\bar{n}}_{shift}^{RA} - 1, \end{cases}$$

wherein $N_{CS}$ has a value indicated by the indication information; and for $$\frac{N_{ZC} + N_{CS}}{4} \le d_u < \frac{2}{7}N_{ZC}, n_{shift}^{RA}, d_{start},$$

$$n_{group}^{RA}, \bar{n}_{shift}^{RA}, \bar{\bar{n}}_{shift}^{RA}, \bar{d}_{start}, \text{ and } \bar{\bar{d}}_{start}$$

satisfy:

$$n_{shift}^{RA} = \left\lfloor \frac{4d_u - N_{ZC}}{N_{CS}} \right\rfloor$$

$$d_{start} = 4d_u - N_{ZC} + n_{shift}^{RA} \cdot N_{CS}$$

$$n_{group}^{RA} = \left\lfloor \frac{d_u}{d_{start}} \right\rfloor$$

$$\bar{n}_{shift}^{RA} = \max\left(\left\lfloor \frac{N_{ZC} - 3d_u - n_{group}^{RA} \cdot d_{start}}{N_{CS}} \right\rfloor, 0\right)$$

$$\bar{\bar{n}}_{shift}^{RA} = \left\lfloor \min(d_u - n_{group}^{RA} \cdot d_{start}, 4d_u - N_{ZC} - \bar{n}_{shift}^{RA} N_{CS})/N_{CS} \right\rfloor$$

$$\bar{d}_{start} = N_{ZC} - 3d_u + n_{group}^{RA} \cdot d_{start} + \bar{n}_{shift}^{RA} N_{CS}$$

$$\bar{\bar{n}}_{shift}^{RA} = \left\lfloor ((1 - \min(1, \bar{n}_{shift}^{RA}))(d_u - \bar{n}_{group}^{RA} \cdot d_{start}) + \min(1, \bar{n}_{shift}^{RA})(4d_u - N_{ZC} - \bar{n}_{shift}^{RA} N_{CS}))/N_{CS} \right\rfloor - \bar{n}_{shift}^{RA}$$

$$\bar{\bar{d}}_{start} = N_{ZC} - 2d_u + n_{group}^{RA} \cdot d_{start} + \bar{\bar{n}}_{shift}^{RA} N_{CS};$$

wherein $d_u$ satisfies:

$$d_u = \begin{cases} p & 0 \le p < N_{ZC}/2 \\ N_{ZC} - p & \text{otherwise} \end{cases},$$

and p is defined as a smallest nonnegative integer that satisfies (p×u)mod $N_{ZC}$=1.

13. The device according to claim 12, wherein for $$\frac{2}{7}N_{ZC} \le d_u \le \frac{N_{ZC} - N_{CS}}{3}, n_{shift}^{RA}, d_{start},$$

$$n_{group}^{RA}, \bar{n}_{shift}^{RA}, \bar{\bar{n}}_{shift}^{RA}, \bar{d}_{start}, \text{ and } \bar{\bar{d}}_{start}$$

satisfy:

$$n_{shift}^{RA} = \left\lfloor \frac{N_{ZC} - 3d_u}{N_{CS}} \right\rfloor$$

$$d_{start} = N_{ZC} - 3d_u + n_{shift}^{RA} \cdot N_{CS}$$

$$n_{group}^{RA} = \left\lfloor \frac{d_u}{d_{start}} \right\rfloor$$

$$\bar{n}_{shift}^{RA} = \max\left(\left\lfloor \frac{4d_u - N_{ZC} - n_{group}^{RA} \cdot d_{start}}{N_{CS}} \right\rfloor, 0\right)$$

$$\bar{\bar{n}}_{shift}^{RA} = \left\lfloor \min(d_u - n_{group}^{RA} \cdot d_{start}, N_{ZC} - 3d_u - \bar{n}_{shift}^{RA} N_{CS})/N_{CS} \right\rfloor$$

$$\bar{d}_{start} = d_u + n_{group}^{RA} \cdot d_{start} + \bar{n}_{shift}^{RA} N_{CS}$$

$$\bar{\bar{n}}_{shift}^{RA} = 0, \bar{\bar{d}}_{start} = 0$$

14. The device according to claim 12, wherein for $$\frac{N_{ZC} + N_{CS}}{3} \le d_u < \frac{2N_{ZC}}{5}, n_{shift}^{RA}, d_{start},$$

$$n_{group}^{RA}, \bar{n}_{shift}^{RA}, \bar{\bar{n}}_{shift}^{RA}, \bar{d}_{start}, \text{ and } \bar{\bar{d}}_{start}$$

satisfy:

$$n_{shift}^{RA} = \left\lfloor \frac{3d_u - N_{ZC}}{N_{CS}} \right\rfloor$$

$$d_{start} = 3d_u - N_{ZC} + n_{shift}^{RA} \cdot N_{CS}$$

$$n_{group}^{RA} = \left\lfloor \frac{d_u}{d_{start}} \right\rfloor$$

$$\bar{n}_{shift}^{RA} = \max\left(\left\lfloor \frac{N_{ZC} - 2d_u - n_{group}^{RA} \cdot d_{start}}{N_{CS}} \right\rfloor, 0\right)$$

$$\bar{\bar{n}}_{shift}^{RA} = 0, \bar{d}_{start} = 0, \bar{\bar{n}}_{shift}^{RA} = 0, \bar{\bar{d}}_{start} = 0.$$

15. The device according to claim 4, wherein for $$\frac{2N_{ZC}}{5} \le d_u \le \frac{N_{ZC} - N_{CS}}{2}, n_{shift}^{RA}, d_{start},$$

$$n_{group}^{RA}, \bar{n}_{shift}^{RA}, = n_{shift}^{RA}, \bar{\bar{n}}_{shift}^{RA}, \bar{d}_{start}, \text{ and } = \bar{d}_{start}$$

satisfy:

$$n_{shift}^{RA} = \left\lfloor \frac{N_{ZC} - 2d_u}{N_{CS}} \right\rfloor$$

$$d_{start} = 2(N_{ZC} - 2d_u) + n_{shift}^{RA} \cdot N_{CS}$$

$$n_{group}^{RA} = \left\lfloor \frac{N_{ZC} - d_u}{d_{start}} \right\rfloor$$

$$\bar{n}_{shift}^{RA} = \max\left(\left\lfloor \frac{3d_u - N_{ZC} - n_{group}^{RA} \cdot d_{start}}{N_{CS}} \right\rfloor, 0\right)$$

$$\bar{\bar{n}}_{shift}^{RA} = 0, \bar{d}_{start} = 0, \bar{\bar{n}}_{shift}^{RA} = 0, \bar{\bar{d}}_{start} = 0$$

16. The device according to claim 12, wherein for $N_{CS} \leq d_u < N_{ZC}/5$, $n_{shift}^{RA}$, $d_{start}$, $n_{group}^{RA}$, and $\bar{n}_{shift}^{RA}$ satisfy:

$n_{shift}^{RA} = \lfloor d_u/N_{CS} \rfloor$ $d_{start} = 4d_u + n_{shift}^{RA} N_{CS}$ $n_{group}^{RA} = \lfloor N_{ZC}/d_{start} \rfloor$ $\bar{n}_{shift}^{RA} = \max(\lfloor (N_{ZC} - 4d_u - n_{group}^{RA} d_{start})/N_{CS} \rfloor, 0)$; and for $N_{ZC}/5 \leq d_u \leq (N_{ZC} - N_{CS})/4$, $n_{shift}^{RA}$, $d_{start}$, $n_{group}^{RA}$, and $\bar{n}_{shift}^{RA}$ satisfy:

$n_{shift}^{RA} = \lfloor (N_{ZC} - 4d_u)/N_{CS} \rfloor$ $d_{start} = N_{ZC} - 4d_u + n_{shift}^{RA} N_{CS}$ $n_{group}^{RA} = \lfloor d_u/d_{start} \rfloor$ $\bar{n}_{shift}^{RA} = \min(\max(\lfloor (d_u - n_{group}^{RA} d_{start})/N_{CS} \rfloor, 0), n_{shift}^{RA})$.

17. The device according to claim 16, wherein for $\frac{2}{7} N_{ZC} \leq d_u \leq \frac{N_{ZC} - N_{CS}}{3}$, $n_{shift}^{RA}$, $d_{start}$, $n_{group}^{RA}, \bar{n}_{shift}^{RA}, \bar{\bar{n}}_{shift}^{RA}, \bar{\bar{\bar{n}}}_{shift}^{RA}, \bar{\bar{d}}_{start}$, and $\bar{\bar{\bar{d}}}_{start}$ satisfy $n_{shift}^{RA} = \left\lfloor \frac{N_{ZC} - 3d_u}{N_{CS}} \right\rfloor$ $d_{start} = N_{ZC} - 3d_u + n_{shift}^{RA} \cdot N_{CS}$ $n_{group}^{RA} = \left\lfloor \frac{d_u}{d_{start}} \right\rfloor$ $\bar{n}_{shift}^{RA} = \max\left(\left\lfloor \frac{4d_u - N_{ZC} - n_{group}^{RA} \cdot d_{start}}{N_{CS}} \right\rfloor, 0\right)$;

$\bar{\bar{n}}_{shift}^{RA} = \lfloor \min(d_u - n_{group}^{RA} \cdot d_{start}, N_{ZC} - 3d_u - \bar{n}_{shift}^{RA} N_{CS}) / N_{CS} \rfloor$ $\bar{\bar{d}}_{start} = d_u + n_{group}^{RA} \cdot d_{start} + \bar{n}_{shift}^{RA} N_{CS}$ $\bar{\bar{\bar{n}}}_{shift}^{RA} = 0, \bar{\bar{\bar{d}}}_{start} = 0$ for $\frac{N_{ZC} + N_{CS}}{3} \leq d_u < \frac{2N_{ZC}}{5}$, $n_{shift}^{RA}$, $d_{start}$, $n_{group}^{RA}, \bar{n}_{shift}^{RA}, \bar{\bar{n}}_{shift}^{RA}, \bar{\bar{\bar{n}}}_{shift}^{RA}, \bar{\bar{d}}_{start}$, and $\bar{\bar{\bar{d}}}_{start}$ satisfy:

$n_{shift}^{RA} = \left\lfloor \frac{3d_u - N_{ZC}}{N_{CS}} \right\rfloor$ $d_{start} = 3d_u - N_{ZC} + n_{shift}^{RA} \cdot N_{CS}$ $n_{group}^{RA} = \left\lfloor \frac{d_u}{d_{start}} \right\rfloor$ and $\bar{n}_{shift}^{RA} = \max\left(\left\lfloor \frac{N_{ZC} - 2d_u - n_{group}^{RA} \cdot d_{start}}{N_{CS}} \right\rfloor, 0\right)$;

$\bar{\bar{n}}_{shift}^{RA} = 0, \bar{\bar{d}}_{start} = 0, \bar{\bar{\bar{n}}}_{shift}^{RA} = 0, \bar{\bar{\bar{d}}}_{start} = 0$ for $\frac{2N_{ZC}}{5} \leq d_u \leq \frac{N_{ZC} - N_{CS}}{2}$, $n_{shift}^{RA}$, $d_{start}$, $n_{group}^{RA}, \bar{n}_{shift}^{RA}, \bar{\bar{n}}_{shift}^{RA}, \bar{\bar{\bar{n}}}_{shift}^{RA}, \bar{\bar{d}}_{start}$, and $\bar{\bar{\bar{d}}}_{start}$ satisfy:

$n_{shift}^{RA} = \left\lfloor \frac{N_{ZC} - 2d_u}{N_{CS}} \right\rfloor$ $d_{start} = 2(N_{ZC} - 2d_u) + n_{shift}^{RA} \cdot N_{CS}$ $n_{group}^{RA} = \left\lfloor \frac{N_{ZC} - d_u}{d_{start}} \right\rfloor$ $\bar{n}_{shift}^{RA} = \max\left(\left\lfloor \frac{3d_u - N_{ZC} - n_{group}^{RA} \cdot d_{start}}{N_{CS}} \right\rfloor, 0\right)$ $\bar{\bar{n}}_{shift}^{RA} = 0, \bar{\bar{d}}_{start} = 0, \bar{\bar{\bar{n}}}_{shift}^{RA} = 0, \bar{\bar{\bar{d}}}_{start} = 0$

18. The device according to claim 12, wherein for $\frac{2}{7} N_{ZC} \leq d_u \leq \frac{N_{ZC} - N_{CS}}{3}$, $n_{shift}^{RA}$, $d_{start}$, $n_{group}^{RA}, \bar{n}_{shift}^{RA}, \bar{\bar{n}}_{shift}^{RA}, \bar{\bar{\bar{n}}}_{shift}^{RA}, \bar{\bar{d}}_{start}$, and $\bar{\bar{\bar{d}}}_{start}$ satisfy:

$n_{shift}^{RA} = \left\lfloor \frac{N_{ZC} - 3d_u}{N_{CS}} \right\rfloor$ $d_{start} = N_{ZC} - 3d_u + n_{shift}^{RA} \cdot N_{CS}$ $n_{group}^{RA} = \left\lfloor \frac{d_u}{d_{start}} \right\rfloor$ $\bar{n}_{shift}^{RA} = \max\left(\left\lfloor \frac{4d_u - N_{ZC} - n_{group}^{RA} \cdot d_{start}}{N_{CS}} \right\rfloor, 0\right)$;

$\bar{\bar{n}}_{shift}^{RA} = \lfloor \min(d_u - n_{group}^{RA} \cdot d_{start}, N_{ZC} - 3d_u - \bar{n}_{shift}^{RA} N_{CS}) / N_{CS} \rfloor$ $\bar{\bar{d}}_{start} = d_u + n_{group}^{RA} \cdot d_{start} + \bar{n}_{shift}^{RA} N_{CS}$ $\bar{\bar{\bar{n}}}_{shift}^{RA} = 0, \bar{\bar{\bar{d}}}_{start} = 0$ for $\frac{N_{ZC} + N_{CS}}{3} \leq d_u < \frac{2N_{ZC}}{5}$, $n_{shift}^{RA}$, $d_{start}$, $n_{group}^{RA}, \bar{n}_{shift}^{RA}, \bar{\bar{n}}_{shift}^{RA}, \bar{\bar{\bar{n}}}_{shift}^{RA}, \bar{\bar{d}}_{start}$, and $\bar{\bar{\bar{d}}}_{start}$ satisfy:

$$n_{shift}^{RA} = \left\lfloor \frac{3d_u - N_{ZC}}{N_{CS}} \right\rfloor$$
$$d_{start} = 3d_u - N_{ZC} + n_{shift}^{RA} \cdot N_{CS}$$
$$n_{group}^{RA} = \left\lfloor \frac{d_u}{d_{start}} \right\rfloor \text{ and }$$
$$\bar{n}_{shift}^{RA} = \max\left(\left\lfloor \frac{N_{ZC} - 2d_u - n_{group}^{RA} \cdot d_{start}}{N_{CS}} \right\rfloor, 0\right)$$
$$\bar{\bar{n}}_{shift}^{RA} = 0, \bar{d}_{start} = 0, \bar{\bar{n}}_{shift}^{RA} = 0, \bar{\bar{d}}_{start} = 0$$

for $$\frac{2N_{ZC}}{5} \le d_u \le \frac{N_{ZC} - N_{CS}}{2}, n_{shift}^{RA}, d_{start},$$

$$n_{group}^{RA}, \bar{n}_{shift}^{RA}, \bar{\bar{n}}_{shift}^{RA}, \bar{\bar{\bar{n}}}_{shift}^{RA}, \bar{d}_{start}, \text{ and } \bar{\bar{d}}_{start}$$

satisfy:

$$n_{shift}^{RA} = \left\lfloor \frac{N_{ZC} - 2d_u}{N_{CS}} \right\rfloor$$
$$d_{start} = 2(N_{ZC} - 2d_u) + n_{shift}^{RA} \cdot N_{CS}$$
$$n_{group}^{RA} = \left\lfloor \frac{N_{ZC} - d_u}{d_{start}} \right\rfloor$$
$$\bar{n}_{shift}^{RA} = \max\left(\left\lfloor \frac{3d_u - N_{ZC} - n_{group}^{RA} \cdot d_{start}}{N_{CS}} \right\rfloor, 0\right)$$
$$\bar{\bar{n}}_{shift}^{RA} = 0, \bar{d}_{start} = 0, \bar{\bar{n}}_{shift}^{RA} = 0, \bar{\bar{d}}_{start} = 0$$

19. The device according to claim 12, wherein the indication information includes an Ncs index.

20. The device according to claim 19, wherein a mapping relationship between the Ncs index and a value of Ncs is as follows:

| Ncs index | Ncs |
|---|---|
| 0 | 15 |
| 1 | 18 |
| 2 | 22 |
| 3 | 26 |
| 4 | 32 |
| 5 | 38 |
| 6 | 46 |
| 7 | 55 |
| 8 | 68 |
| 9 | 82 |
| 10 | 100 |
| 11 | 118 |
| 12 | 137. |

21. The device according to claim 12, wherein the sequence with the root sequence number u and the sequence length $N_{ZC}$ satisfies:

$$x_u(n) = e^{-j\frac{\pi u n(n+1)}{N_{ZC}}}, 0 \le n \le N_{ZC} - 1.$$

22. The device according to claim 12, wherein the program instructions, when executed by the one or more processors, cause the device further to:
    indicate a logic root sequence number, wherein the logic root sequence number is associated with the root sequence number u.

\* \* \* \* \*

UNITED STATES PATENT AND TRADEMARK OFFICE
CERTIFICATE OF CORRECTION

PATENT NO. : 12,068,899 B2
APPLICATION NO. : 17/220731
DATED : August 20, 2024
INVENTOR(S) : Zhao et al.

Page 1 of 2

It is certified that error appears in the above-identified patent and that said Letters Patent is hereby corrected as shown below:

In the Specification

In Column 3, Line 43, delete "$d_{start} - 3d_u$" and insert -- $d_{start} = 3d_u$ --.

In Column 4, Line 10, delete "satisfy" and insert -- satisfy: --.

In Columns 19-20, Line 8, delete "$n_{group}^{RA} n_{group}^{RA}$" and insert -- $n_{shift}^{RA} n_{group}^{RA}$ --.

In Column 20, Line 38, delete "$n_{group}^{RA} n_{group}^{RA}$" and insert -- $n_{shift}^{RA} n_{group}^{RA}$ --.

In Column 24, Lines 15-16, delete "$n_{group}^{RA} n_{shift}^{RA}$" and insert -- $n_{group}^{RA}, \overline{n}_{shift}^{RA},$ --.

In Column 27, Line 42, delete "satisfy" and insert -- satisfy: --.

In Column 34, Line 27, delete "is U is" and insert -- is u is --.

In Column 34, Line 35, delete "number V" and insert -- number v --.

In Column 34, Line 46, delete "–1a)," and insert -- –1), --.

In Column 34, Line 51, delete "–1," and insert -- –1), --.

In Column 37, Line 17, delete "390" and insert -- 390, --.

In Column 39, Line 21, delete "[γ]" and insert -- $\lfloor Y \rfloor$ --.

Signed and Sealed this
Twenty-fifth Day of March, 2025

Coke Morgan Stewart
*Acting Director of the United States Patent and Trademark Office*

CERTIFICATE OF CORRECTION (continued)
U.S. Pat. No. 12,068,899 B2

In Column 39, Line 22, delete "$\gamma$" and insert -- Y --.

In Column 39, Line 22, delete "[$\gamma$]" and insert -- $\lfloor Y \rfloor$ --.

In the Claims

In Column 58, in Claim 15, Line 45, delete "claim 4," and insert -- claim 12, --.

In Column 59, in Claim 17, Line 29, delete "satisfy" and insert -- satisfy: --.